United States Patent
Johnston et al.

(10) Patent No.: US 12,335,740 B2
(45) Date of Patent: Jun. 17, 2025

(54) RESOURCE CONNECTIVITY FOR MULTIPLE DEVICES

(71) Applicant: Google LLC, Mountain View, CA (US)

(72) Inventors: Jesse Johnston, San Jose, CA (US); James Daniel Hawkins, Los Angeles, CA (US); Shiba Sheikh, San Francisco, CA (US); Jonathan Mann, Venice, CA (US); Claudius van der Merwe, Camden Wyoming, DE (US)

(73) Assignee: Google LLC, Mountain View, CA (US)

( * ) Notice: Subject to any disclaimer, the term of this patent is extended or adjusted under 35 U.S.C. 154(b) by 795 days.

(21) Appl. No.: 17/304,327

(22) Filed: Jun. 18, 2021

(65) Prior Publication Data
US 2022/0408268 A1   Dec. 22, 2022

(51) Int. Cl.
*G06F 21/00* (2013.01)
*G06F 3/16* (2006.01)
(Continued)

(52) U.S. Cl.
CPC ............ *H04W 12/64* (2021.01); *G06F 3/165* (2013.01); *H04L 63/20* (2013.01); *H04M 1/72454* (2021.01); *H04M 1/72463* (2021.01)

(58) Field of Classification Search
CPC .... G06F 3/165; H04L 63/20; H04M 1/72463; H04W 12/64
See application file for complete search history.

(56) References Cited

U.S. PATENT DOCUMENTS 8,433,291 B1 * 4/2013 Hertzfeld .......... H04M 1/72451
455/411
8,799,989 B1   8/2014 Liu
(Continued)

FOREIGN PATENT DOCUMENTS

WO   WO-2015200051 A1 * 12/2015 ............. H04L 67/10

OTHER PUBLICATIONS

"Airdroid", retrieved from play.google.com/store/apps/details?id=com.sand.airdroid on Feb. 26, 2021, 6 pages.
(Continued)

*Primary Examiner* — Rodman Alexander Mahmoudi
(74) *Attorney, Agent, or Firm* — Brake Hughes Bellermann LLP

(57) ABSTRACT

Methods for improving resource connectivity for users' various computing devices are disclosed. An example method may include establishing a local connection with a sending device, receiving device status information and task status information from the sending device using the local connection, the task status information identifying at least one media content, and generating a user interface that includes a graphical representation of the device status information and a first control that, when selected, executes the at least one media content in an application on the receiving device. Another example method may include detecting an interaction with a UI element that sets a network sharing status to an on state, identifying a locally stored network as shareable, generating an instance of a network data type for the locally stored network, and associating the instance with the user account so that the locally stored network is shared with the user's other devices.

18 Claims, 14 Drawing Sheets

(51) Int. Cl.
  *H04L 9/40*       (2022.01)
  *H04L 29/06*      (2006.01)
  *H04M 1/72454*    (2021.01)
  *H04M 1/72463*    (2021.01)
  *H04W 12/64*      (2021.01)

(56) References Cited

U.S. PATENT DOCUMENTS

| | | | |
|---|---|---|---|
| 8,971,556 B2 * | 3/2015 | Fleizach | H04R 25/558 |
| | | | 381/315 |
| 9,203,838 B2 | 12/2015 | Kuscher et al. | |
| 9,297,882 B1 * | 3/2016 | Bhatia | H04W 4/029 |
| 10,524,119 B2 | 12/2019 | Altin et al. | |
| 10,939,500 B1 * | 3/2021 | Kiraly | H04W 68/00 |
| 2012/0082209 A1 * | 4/2012 | Li | H04N 19/176 |
| | | | 375/E7.126 |
| 2014/0362293 A1 * | 12/2014 | Bakar | H04L 67/148 |
| | | | 348/552 |
| 2016/0105729 A1 * | 4/2016 | Stein | H04N 21/436 |
| | | | 725/33 |
| 2016/0226732 A1 * | 8/2016 | Kim | H04W 4/70 |
| 2017/0187866 A1 * | 6/2017 | Li | G06F 3/04883 |
| 2018/0332160 A1 | 11/2018 | Brogan et al. | |
| 2019/0068686 A1 * | 2/2019 | Väänänen | H04L 9/0861 |
| 2019/0092283 A1 * | 3/2019 | Kristinsson | H04W 12/065 |
| 2021/0216198 A1 * | 7/2021 | Chase | H04L 65/60 |

OTHER PUBLICATIONS

"How to configure Dell Mobile Connect for Android", retrieved from www.dell.com/support/kbdoc/en-us/000129725/how-to-configure-dell-mobile-connect-for-android on Feb. 21, 2021, 20 pages.

"Magical experience of seamlessly connected devices", Samsung Flow, retrieved from www.samsung.com/global/galaxy/apps/samsung-flow/#:~:text=Magical%20experience%20of%20seamlessly%20connected,your%20smartphone%20and%20Tablet%2FPC on Feb. 27, 2021, 18 pages.

"View Your Saved iPhone Wi-Fi Passwords by using your MAC", MACTIP, retrieved from www.mactip.net/view-saved-iphone-wifi-passwords-using-mac/) , Mar. 14, 2018, 11 pages.

Bradshaw, "Google Play Services Preps to Sync Wi-Fi Passwords Between Android and Chrome OS", retrieved from 9to5google.com/2020/11/13/google-play-services-sync-wi-fi-passwords-android-chrome-os/, Nov. 13, 2020, 2 pages.

Cipriani, "How to use Android's Instant Tethering feature", CNET, retrieved from https://www.cnet.com/tech/mobile/how-to-use-androids-instant-tethering-feature/, Feb. 6, 2019, 5 pages.

Dickerson, "Chrome OS Wi-Fi Sync Is Now Rolling Out Alongside Phone Hub", Google News, retrieved from www.androidheadlines.com/2021/02/chrome-os-wi-fi-sync.html, Feb. 22, 2021, 7 pages.

Payne, "This upcoming Chrome OS feature will make WI-FI connectivity much simpler", retrieved from chromeunboxed.com/chromebook-wifi-android-phone-sync-passwords-setup, Aug. 24, 2020, 5 pages.

Tofel, "Chrome OS may sync Wi-Fi configurations between your Chromebook and Android phone", About Chromebooks, retrieved from www.aboutchromebooks.com/news/chrome-os-may-sync-wi-fi-configurations-between-your-chromebook-and-android-phone/, Aug. 20, 2020, 5 pages.

Vonau, "Chome OS 85 comes with Wi-FI password sync, redesigned settings search, and a mic volume slider", retrieved from www.androidpolice.com/2020/09/03/chrome-os-85-comes-with-wi-fi-password-sync-redesigned-settings-search-and-a-mic-volume-slider/, Sep. 3, 2020, 7 pages.

"Your Phone", retrieved from https://docs.microsoft.com/en-us/windows-insider/apps/your-phone, Nov. 11, 2020, 26 pages.

De Fremery, "How to use Microsoft Your Phone Companion on your Galaxy smartphone," Samsung, retrieved from insights.samsung.com/2021/01/21/how-to-use-microsoft-your-phone-companion-on-your-galaxy-smartphone-2/, Jan. 21, 2021, 4 pages.

* cited by examiner

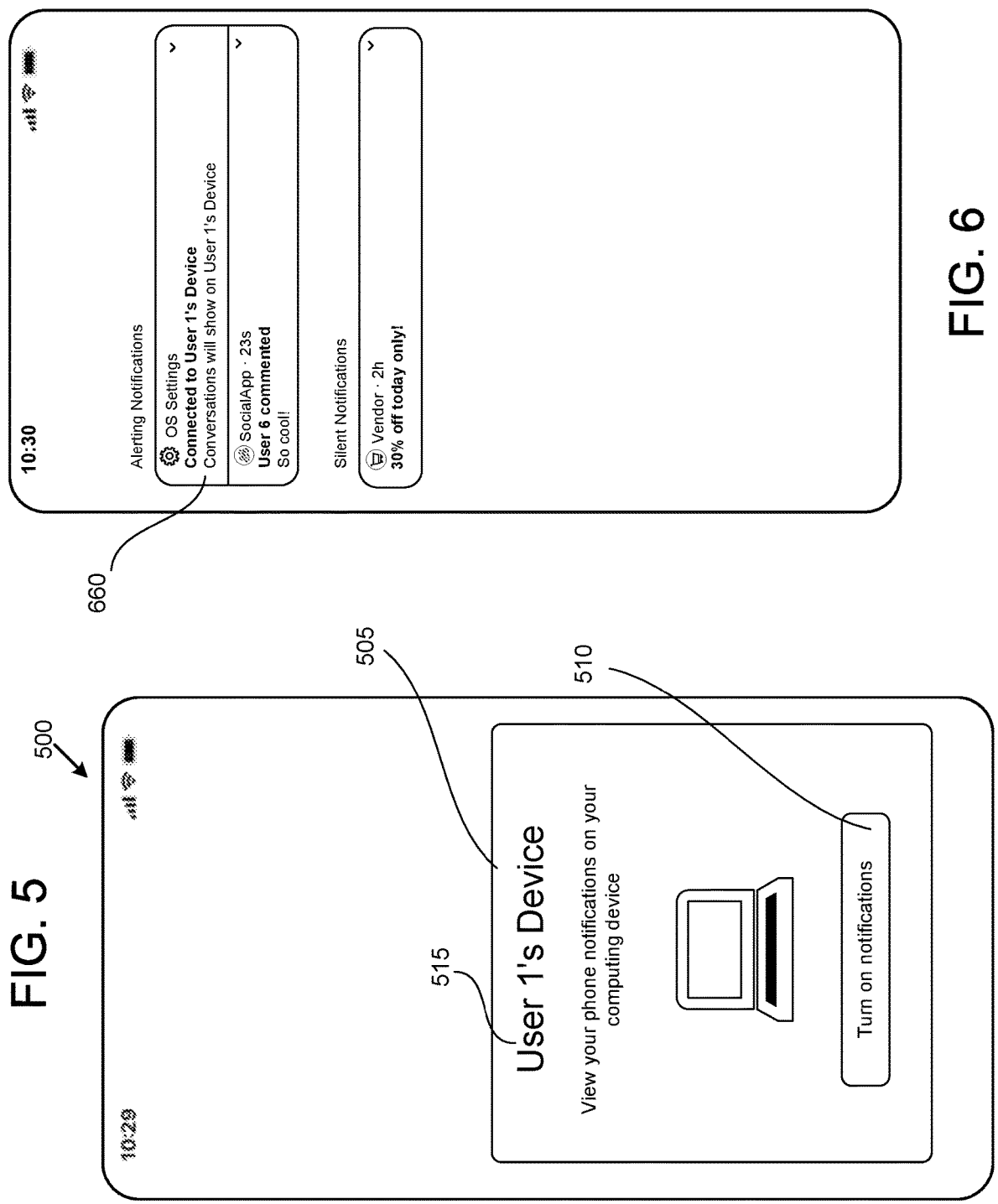

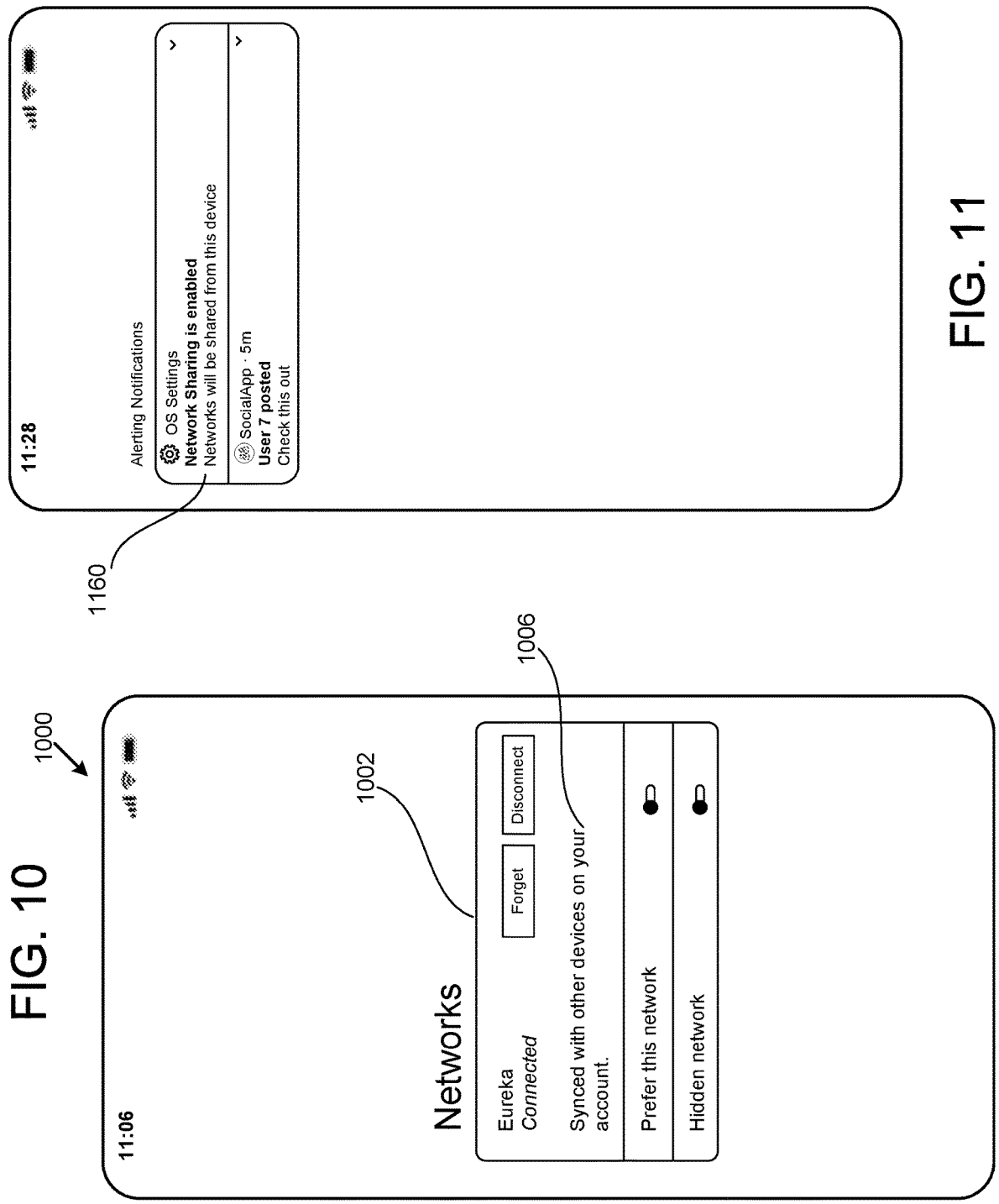

RESOURCE CONNECTIVITY FOR MULTIPLE DEVICES

BACKGROUND

Users often use multiple devices to complete tasks. For example, a user may use one device at school, and then use another device at home, or may use a smart phone and one or more portable devices. In some examples, a user may use multiple devices at work. Mobile and portable devices often utilize a connection to one or more wireless networks. But each device is often set up differently, including differently installed applications, different operating systems, etc., so activities performed on one device may not be performed on another device. Additionally, a user's information, settings, activities, and files do not follow them to new devices.

SUMMARY

Implementations provide technical solutions for exchanging different kinds of device data between devices associated with a user to deliver a seamless cross-device experience, and which may reduce the need for user interaction with multiple devices in a user device ecosystem. In one implementation, a user interface may enable a device the user is currently using to show information about another device associated with the user, such as a smart phone. The user interface enables the sending device to exchange metadata with the receiving device on a regular, periodic interval, so long as the sending device is nearby, e.g., within a secure range, such as the range of a short-range wireless standard. The metadata can be encrypted and include device status information, recent task information, or cross-device instructions (commands). In one implementation, a process for automatic, secure synchronization of secure wireless networks is provided, which enables a user-associated device to automatically and seamlessly connect to any of the secure wireless networks associated with the user. These concepts enable the user to connect once to a secure network and have other user-associated devices utilize the wireless network without having the user provide further input, which may provide a seamless experience for the user.

According to an aspect, a method may be performed on a receiving computing device. The method may include establishing a local connection with a sending computing device, receiving device status information and task status information from the sending computing device using the local connection, the task status information identifying at least one media content, and generating a user interface that includes a graphical representation of the device status information and a first control that, when selected, executes the at least one media content in an application on the receiving computing device.

According to an aspect, a method may include generating a user interface element that controls a network sharing status for a user account of the computing device, the network sharing status being one of an off state and an on state. Responsive to detecting an interaction with the user interface element that sets the network sharing status to the on state the method may also include identifying a locally stored network as shareable, generating an instance of a network data type for the locally stored network, the network data type including a timestamp for the locally stored network representing a connection time for the locally stored network, associating the instance with the user account, and modifying the network sharing status associated with the user account to the on state, wherein associating the instance of with the user account provides the instance to another device associated with the user account.

According to an aspect, a non-transitory computer-readable medium storing executable instructions that when executed by at least one processor are configured to cause the at least one processor to perform any of the methods or procedures disclosed herein.

According to an aspect, a computer system include at least one processor and memory storing instructions that, when executed by the at least one processor, causes the computer system to perform any of the methods or procedures disclosed herein.

One or more of the implementations of the subject matter described herein can be implemented to realize one or more of the following technical advantages/technical effects. As one example, implementations enable cross-device usability while minimizing battery usage on the sending and receiving devices. Specifically, unlike phone-mirroring apps that mirror the display of the sending computing device (e.g., a mobile device), the disclosed cross-device manager does not require the sending device to be 'awake', e.g., with the screen on, for the receiving device to provide cross-device functionality. Instead, the receiving device periodically queries the sending device to obtain a relatively small amount of metadata and relies on the sending device to push other information, such as conversation notifications and/or recent tasks or images. Thus, the user has access to certain device status information with reduced or minimum bandwidth and battery usage.

As another example, instead of pushing all notifications to the receiving device, implementations may push only certain kinds of notifications, such as conversation notifications, to the receiving device. Conversation notifications are notifications that include a reply capability. In some implementations, silent notifications are not pushed even if the notification is a conversation notification. Silent notifications are notifications generated by a messaging application at the sending device but that the user has indicated should not result in a sound, indicator, or inclusion in a notifications interface on the sending device. This minimizes network traffic and battery usage by reducing the data pushed by the sending device to the receiving device. Thus, disclosed implementations provide the user with access to conversation notifications, which may allow a user actively using the receiving device to participate in a conversation, while minimizing additional bandwidth and battery usage that would otherwise be associated with non-conversation notifications.

As another example, implementations provide tools to control the sending device from the receiving device, such as overriding a sound mode (e.g., muting, ringing, vibration) or remotely triggering connectivity, sharing tools, or other sending device settings. For example, the user can silence a ringing phone that is out of arm's reach, make a muted phone ring to more easily locate the phone, set a tablet in a carry-on bag to airplane mode, etc. The sending device may be controlled from the receiving device without a further user input being provided at the sending device, for example at a user interface of the sending device. The ability to control the sending device from the receiving device may have advantages for users with mobility issues, who may be near the receiving device but have difficulty accessing the sending device. As another example, implementations enable certain tasks to be continued from one device to the next within a user's ecosystem of devices, where the next device has supporting applications installed. Thus, implementations allow for simplified, more efficient use of the devices within a user's device ecosystem, empowering the user to ignore the technology and individual devices in the ecosystem (e.g., reduce the scenarios where a user must retrieve a phone or repeat an action on a sending device), improving user productivity. Thus, implementations conserve battery life and minimize data communicated across the devices while still delivering a seamless cross-device platform.

As another example, implementations provide seamless access to secured networks across devices while enabling a user to maintain control of the sharing from any single device, which may simplify the provision of network connectivity to devices within a user's device ecosystem in a secure manner. Some implementations store the shared network information as an encrypted data type in a server-stored user account. Thus, implementations enable a device to automatically receive updates to the network information via any connection with the server storing the user account. Implementations enable the user to determine, on a device basis, whether that device participates in the syncing of wireless networks. Implementations also may not sync all wireless networks, e.g., excluding unsecured, hidden, or shared networks, which reduces or minimizes usage of communication bandwidth and memory, which enhances security while reducing the number of inputs required by a user to set up and/or use subsequent devices. The network data type can include a last connection timestamp, which enables the system to resolve conflicts in network information and push updated information to devices associated with the user. Some implementations include an ability to push wireless network data from one device to another device via a peer-to-peer connection for faster setup.

The details of one or more implementations are set forth in the accompanying drawings and the description below. Other features will be apparent from the description and drawings, and from the claims.

BRIEF DESCRIPTION OF THE DRAWINGS

FIG. 5 illustrates an on-boarding user interface of a sending computing device that executes a connection manager according to an aspect.

FIG. 6 illustrates a notification on a sending computing device that indicates the sending computing device is connected with the receiving computing device according to an aspect.

FIG. 10 illustrates a settings user interface of a computing device that displays a notification indicating a local network is shared with other devices according to an aspect.

FIG. 11 illustrates a notification on a computing device that indicates the network sharing status for the device is active according to an aspect.

DETAILED DESCRIPTION

Figure 1A:
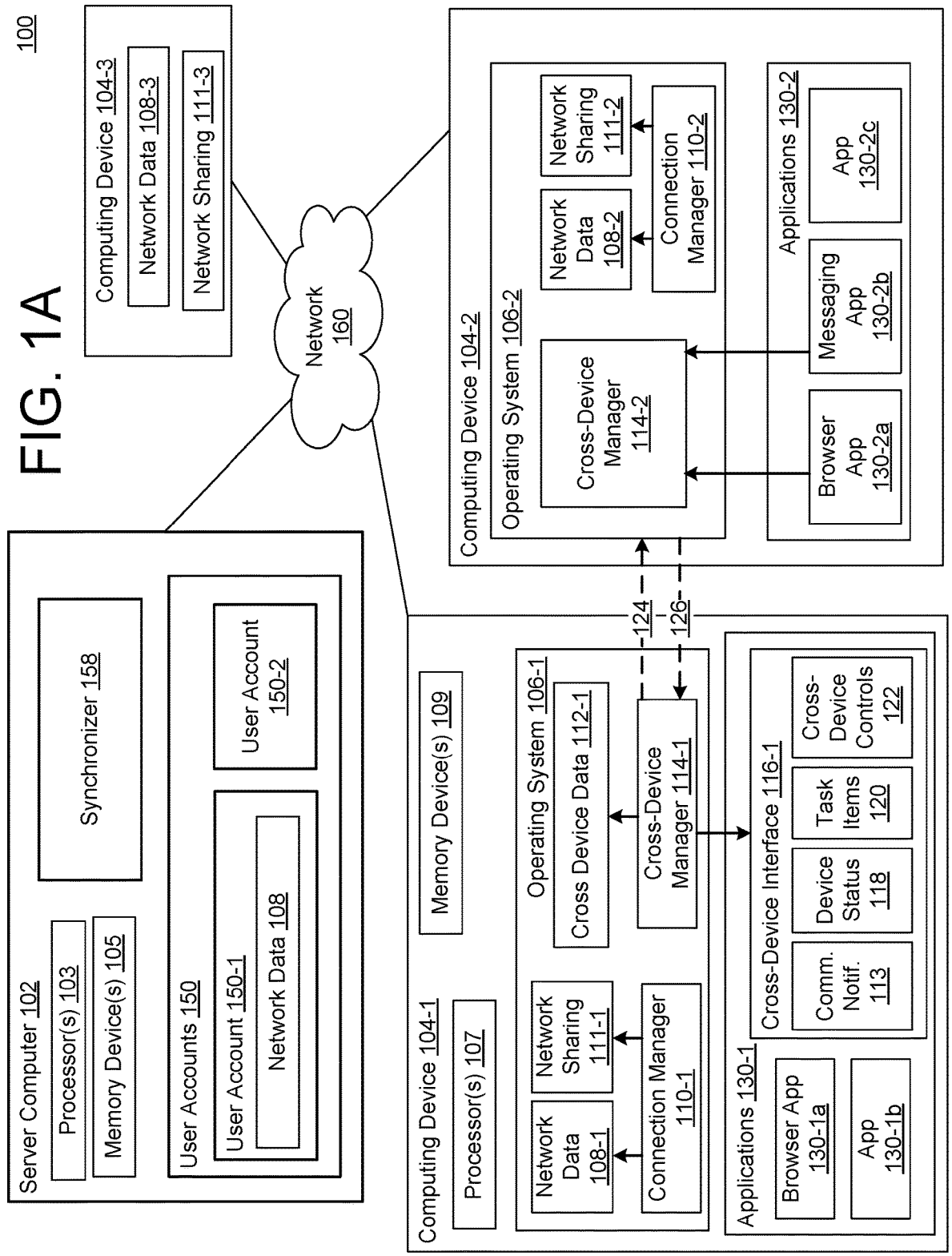
FIG. 1A illustrates a system for improving cross-device connectivity according to an aspect.

This disclosure relates to a connection manager that addresses technical problems related to the use of multiple devices in a user device ecosystem, for example by exchanging different kinds of data between computing devices associated with a user in the user device ecosystem. For example, a user interface may enable a device the user is currently using to selectively and securely communicate with, show information about, and perform certain tasks on another device associated with the user, such as a smart phone. As another example, a user interface and process may enable the user to securely synchronize certain wireless networks across devices, controlling the sharing at the device level. According to aspects of the disclosure, user interaction with the devices in the ecosystem may be simplified, bandwidth and battery usage may be reduced, and a seamless cross-device experience may be delivered. Because users often use multiple devices to complete tasks, a technical solution is needed to provide continuity and control across multiple devices, simplify device setup and maintenance, and improve usability of the devices.

The systems and methods described herein provide a cross-device manager, which represents a technical solution that enables a device the user is currently using (a receiving device) to show information about and notifications from a sending device associated with the user. The sending device can be a mobile device, such as a smart phone, or can be another computing device associated with the user. The sending device may have a connection, e.g., via a cellular network or satellite network, or an installed communications application that enables the sending device to receive conversation notifications not received at the receiving device. The cross-device interface may also enable the sending device to exchange metadata with the receiving device on an ongoing basis, or at an interval. The sending device may push conversation notifications to the receiving device and the user may reply to a notification or clear a notification on the receiving device and send the reply/clearing instructions back to the sending device. In some implementations the receiving and sending devices may communicate over one of a number of wireless networks, but the communications may stop if the sending device is outside of a security range, even if the two devices can communicate via the wireless network. The security range may be defined by a short-range wireless standard, such as BLUETOOTH or a similar standard. The security range may be defined by system settings, e.g., be smaller than a range provided by a short-range wireless standard. This ensures privacy by preventing access to notifications from and cross-device instructions for the sending device when the sending device user is not nearby.

In some examples, the metadata shared between connected devices can include device state data, such as signal strength, battery life, charging status, etc. The metadata can be encrypted. In some implementations the encryption may be accomplished using a key generated for the instance of the local connection. The metadata can include data that enables the user to continue a task on the receiving device recently started on the sending device, such as access a recent browser tab, play a recently accessed media file, view/share/save a recently taken photo, etc. In some implementations, the metadata can include image thumbnails. The image thumbnails may represent images taken with a camera on the sending device. The receiving device may make the thumbnail selectable, so that, when selected, the receiving device requests a transfer of the image from the sending device to the receiving device.

The metadata can include commands for the sending device, referred to as quick commands or cross-device instructions. For example, where the sending device is a mobile device, the instructions can include commands for overriding a sound mode on the mobile device. Overriding the sound mode can include silencing the mobile device by activating a do-not-disturb mode on the sending device. In some implementations, the do-not-disturb mode may have a predetermined duration. The do-not-disturb mode may also silence notifications. Overriding the sound mode can includer causing the mobile device to play an audible output, such as a ringtone or alarm. The audible output may be played regardless of the current sound mode of the sending device, e.g., overriding a vibration only sound mode or silent sound mode. Implementations can include other quick commands, such as causing the sending device to turn on a light, causing the sending device to turn on a hot spot, causing the sending device to turn on airplane mode, causing the sending device to initiate a sharing mode with the receiving device established using a unique service identifier and password (similar to initiating a one-time hot spot), etc. The sharing mode may enable the receiving computing device to use a cellular or satellite data connection of the sending computing device. The commands may cause the action to be performed at the sending device (e.g. turning on the hot spot) without the need for a further user input to be provided at the sending device, such a user input at a user interface of the sending device.

Some implementations may include selected conversation notifications in the metadata shared between devices. The conversation notifications may be from messaging applications and include messages capable of receiving a reply, such as e-mail, SMS applications, social media applications, etc. Implementations can enable a user to read and reply to a message or clear a message (e.g., mark as read on the sending device), even if the receiving device lacks the application in which the message was originally received, or an equivalent. Thus, for example, the receiving device that lacks a social media application can still be used to reply to a direct message received via the social media application running on the sending device. The commands may cause the action be performed at the sending device (e.g. turning on the hot spot) without the need for a further user input to be provided at the sending device, such a user input at a user interface of the sending device. In some embodiments, only notifications from certain users are shared via the metadata, which enables the user to further reduce what notifications are shared in the metadata. The sending device may push these notifications to the receiving device.

In some implementations, the connection manager may use one of a number of local wireless network connections (e.g., Wi-Fi, WebRTC, Wi-Fi Direct, BLUETOOTH, etc.) to request the metadata and receive push notifications. In some implementations, the connection manager may be capable of dynamically changing the protocol used for the connection, e.g., selecting a network connection that is less resource intensive initially or as a preferred connection, but switching to a different network connection if a connection cannot be established via the preferred protocol, the original connection becomes unstable or unavailable, or to conserve resources (such as battery life).

In some implementations, the connection manager provides a technical solution for a technical challenge of sharing and synchronization of secure wireless networks known to the user across all devices used by the user. The sharing can be determined at the device level. Thus, while the sharing may occur through a user account, not all devices associated with the user account may participate in the sharing. Implementations may employ a secure data type where the shared network information is encrypted to store the details of the shared networks. Any computing device used by the user that has an API (Application Program Interface) for accessing networks saved on the device can participate in the network information sharing. The network details may include a network identifier (e.g., SSID), the information needed to connect to the network (e.g., password, security type, etc.), and a last-connect timestamp.

In some implementations, some wireless networks are not shared, or in other words are disqualified from sharing. If the user opts to share networks on a device, the device looks for shareable networks, generally secured networks that are not hidden and not inherited, and generates an instance of the network sharing data type for each shareable network identified. The instances are associated with the user account, e.g., at a user account server. The last connected timestamp may be used by the server and by user-associated devices to determine which of two instances with conflicting network information to keep. In some implementations, the two devices can sync network accounts directly, e.g., via a peer-to-peer connection such as BLUETOOTH or Wi-Fi Direct. For the purposes of this disclosure, a peer-to-peer connection or peer-to-peer protocol establishes a connection between two computing devices without using a hub, server, router, etc. Thus, for the purposes of this disclosure a peer-to-peer connection enables data to be sent directly between the two devices without passing through another device, such as a router, modem, signal booster, server etc. The devices for which network sharing is active may provide an indication of a network's share status, e.g., shared or not shared in a user interface showing network details. Some devices may include a notification indicating that at least one network is being shared with another device.

Figure 1B:
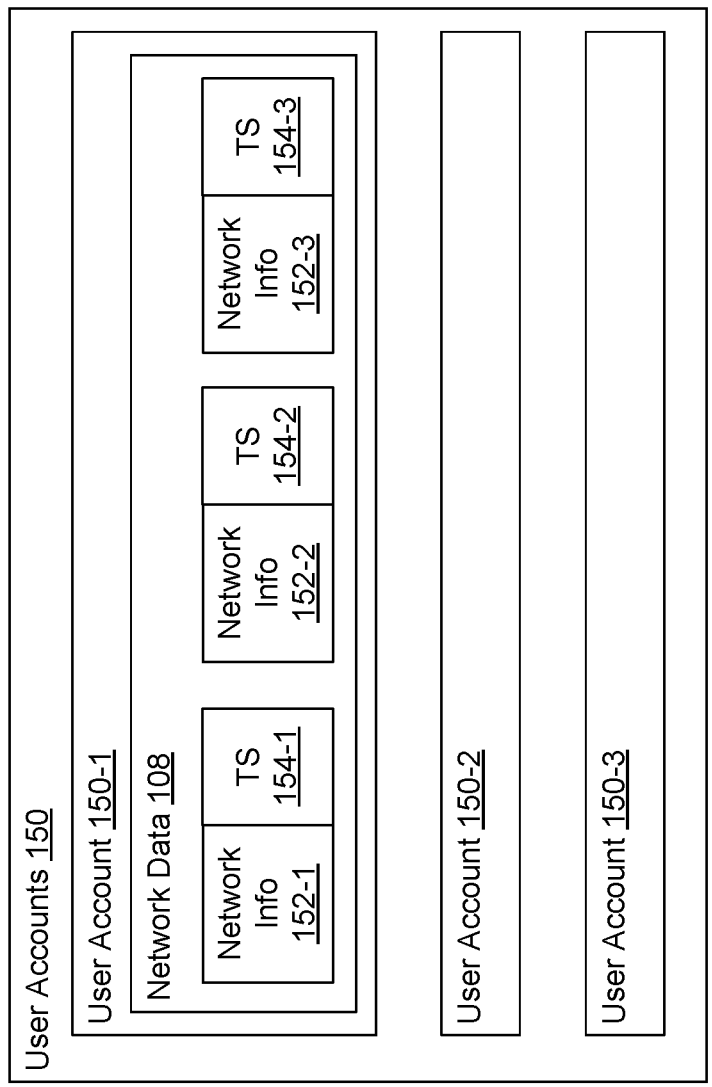
FIG. 1B illustrates examples of network data associated with a user account according to an aspect.

FIGS. 1A and 1B illustrate a system 100 for improving cross-device connectivity according to an aspect. In some examples, improving cross-device connectivity can include sharing network data 108, device status information 118, task items 120, notifications 113, or cross-device controls 122. In some examples, the network data 108 can be synchronized across multiple devices (e.g., computing device 104-1, computing device 104-2, computing device 104-3, etc.). In some examples, the device status information 118, task items 120, notifications 113, or cross-device controls 122 are shared between a receiving device, such as computing device 104-1, and a sending device, such as computing device 104-2.

The computing device 104-1 is a device having an operating system 106-1 with a cross-device interface 116-1 (e.g., a graphical user interface (GUI)), which allows the user to interact with the functionalities of the computing device 104-1. In some examples, the computing device 104-1 includes a personal computer, a mobile phone, a tablet, a netbook, or a laptop. The computing device 104-1 may include one or more processors 107 formed in a substrate configured to execute one or more machine executable instructions or pieces of software, firmware, or a combination thereof. The processors 107 can be semiconductor-based—that is, the processors can include semiconductor material that can perform digital logic. The computing device 104-1 may include one or more memory devices 109. The memory devices 109 may include a main memory that stores information in a format that can be read and/or executed by the processors 107. The memory devices 109 may store applications or modules (e.g., operating system 106-1, applications 130-1, connection manager 110-1, cross-device manager 114-1, etc.) that, when executed by the processors 107, perform certain operations.

The operating system 106-1 is a system software that manages computer hardware, software resources, and provides common services for computing programs. In some examples, the operating system 106-1 is operable to run on a personal computer such as a laptop, netbook, or a desktop computer. In some examples, the operating system 106-1 is operable to run a mobile computer such as a smartphone or tablet. The operating system 106-1 may include a plurality of modules such as a connection manager 110-1 and a cross-device manager 114-1, which are explained later in the disclosure.

In some examples, the computing device 104-1 may communicate with a server computer 102 over a network 160. In some examples, the server computer 102 stores user accounts 150 for users of the various computing devices of the system 100. In some examples, although not shown in FIG. 1A, the computing device 104-1 stores one or more user accounts 150 that pertain to the authorized users of the computing device 104-1. A user account (e.g., 150-1) of the user accounts 150 may store information pertaining to the user, such as a profile of the user and/or information obtained through the user's use of the computing device 104-1 when authorized by the user.

For example, a user of the computing device 104-1 may be provided with controls allowing the user to make an election as to both if and when systems, programs, or features described herein may enable collection of user information (e.g., information about a user's activities, a user's preferences, or a user's current location), and whether the user is sent content or communications from the server computer 102. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user of the computing device 104-1 may have control over what information is collected about the user, how that information is used, and what information is provided to the user and/or to the server computer 102.

The server computer 102 may be a computing device or computing devices that take the form of a number of different devices, for example a standard server, a group of such servers, or a rack server system. In some examples, the server computer 102 may be a single system sharing components such as processors and memories. The network 160 may include the Internet and/or other types of data networks, such as a local area network (LAN), a wide area network (WAN), a cellular network, satellite network, or other types of data networks. The network 160 may also include any number of computing devices (e.g., computer, servers, routers, network switches, etc.) that are configured to receive and/or transmit data within network 160. Network 160 may further include any number of hardwired and/or wireless connections.

The server computer 102 may include one or more processors 103 formed in a substrate, an operating system (not shown) and one or more memory devices 105. The memory devices 105 may represent any kind of (or multiple kinds of) memory (e.g., RAM, flash, cache, disk, tape, etc.). In some examples (not shown), the memory devices 105 may include external storage, e.g., memory physically remote from but accessible by the server computer 102. The server computer 102 may include one or more modules or engines representing specially programmed software. For example, the server computer 102 may include a synchronizer 158 that enables a user to synchronize network data 108 across multiple user-associated devices such as computing device 104-1, computing device 104-2, and computing device 104-3.

The computing device 104-2 is a device having an operating system 106-2 that includes a cross-device manager 114-2 and/or a connection manager 110-2 that enables the computing device to share metadata and network data with another computing device associated with the user, such as computing device 104-1. In the example of FIG. 1A, the computing device 104-2 may be considered the sending device and computing device 104-1 may be considered the receiving device for the cross-device connectivity. In some implementations, the cross-device manager 114-2 of the sending device may be different than the cross-device manager 114-1 of the receiving device in that the cross-device manager 114-2 responds to queries and cross-device instructions sent from the computing device 104-1 (e.g., via cross-device manager 114-1) and may push notifications to the computing device 104-1. In some examples, the computing device 104-2 may include any of the features discussed with respect to the computing device 104-1. Also, although not shown in FIG. 1A, the computing device 104-2 may include one or more processors (e.g., processors 107) and one or more memory devices (e.g., memory devices 109). In some examples, the computing device 104-2 includes a personal computer, a mobile phone, a tablet, a notebook/netbook, or a laptop. In some examples, the computing device 104-2 is the same type of device as computing device 104-1 (e.g., both are laptops, tablets, notebooks, netbooks, smartphones, etc.). In some examples, the computing device 104-1 and the computing device 104-2 are different types of devices (e.g., 104-1 is a netbook, 104-2 is a smart phone, etc.). In some examples, the operating system 106-2 is the same type of operating system as the operating system 106-1.

Similar to computing device 104-1, the computing device 104-2 includes applications 130-2. The applications 130-2 can be similar to applications 130-1, but may be for a different operating system or a different device type. The applications 130-1 may include a browser application 130-2a for viewing webpages and other documents available over the Internet. The applications 130-2 may include one or more messaging applications 130-2b. A messaging application is any application that enables a user to send and receive messages (email, chat, text, SMS, etc.) to and from another user. Thus, messaging applications generate conversation notifications. Although not illustrated, device 104-1 may also include messaging applications. However, device 104-1 need not have any messaging applications installed to reply to conversation notifications via the cross-device user interface 116-1. The computing device 104-2 can have other applications installed, represented generally by application 130-2c. For example, application 130-2c may represent a cross-device interface similar to cross-device interface 116-1.

A user may access a user account 150-1 on the computing devices 104-1 and 104-2, which may include providing a username/password or other type of authentication credential. Successful access to the user account 150-1 may provide access to some or all of the functionalities of the computing device 104-1. The user account 150-1 may be one of the user accounts 150, which pertains to the user of the computing device 104-1 and/or the computing device 104-2. In some examples, the user may be associated with another user account, e.g., user account 150-2. For example, the user may be associated with a primary account (e.g., user account 150-1) and a secondary account (e.g., user account 150-2), where access to either of the primary account or the secondary account provides access to the computing device 104-1 (and similarly on computing device 104-2). In some examples, the user may be associated with both accounts on device 104-1 but only one account on device 104-2. In some examples, the user account 150-1 and the user account 150-2 pertains to different users. For example, user A may provide her authentication credential, which, when authorized, provides access to the computing device 104-1. User B may provide her authentication credential, which, when authorized, provides access to the computing device 104-1. In some examples, the computing device 104-1 displays a login screen to permit the user to supply the user's credential, which, when authenticated, allows the user to access the functionalities of the computing device 104-1. In some examples, the computing device 104-2 displays an unlock screen or login screen to permit the user access to the functionalities of the computing device 104-2 and the user has access to the user account 150-1 based on saved credentials, e.g., a user indicating a desire to "keep me logged in." In some examples, a connection manager 110 or cross-device manager 114 starts in response to the user account 150-1 (or, some examples, user account 150-2) being determined as accessed or when the user interface 116-1 is initially displayed.

The computing device 104-1 may include network data 108-1. The network data 108-1 includes locally stored network information that enables the computing device 104-1 to connect to a local wireless network, e.g., a Wi-Fi network. Each network connection has an identifier, and a security type. If the network is a secured network, the network data 108-1 also includes a password. Some networks may have an indication of whether the network is hidden or not, e.g., a hidden flag, in the network data 108-1. Some networks may have an indication of which user added the network data to the computing device 104-1. Some networks may have an indication of whether the network was added via an enterprise or subject to an enterprise policy. The network data 108-1 for a network may also include other data items, such as whether to connect automatically or whether the computing device 104-1 is currently connected to the network. In disclosed implementations, the network data 108-1 also includes a last connected timestamp. This timestamp is updated each time the computing device 104-1 successfully connects to the network. The network data 108-1 may be accessed by a connection manager 110-1 via an API. Thus, the connection manager 110-1 may query the network data 108-1 via the API.

The connection manager 110-1 may use network sharing flag 111-1 to determine whether or not to share the network data 108-1 with other devices, e.g., by way of user accounts 150. The network sharing flag 111-1 is a user-controlled sharing status that applies to network data 108-1 stored on the computing device 104-1. In some devices, the network sharing flag 111-1 is unique to the device. In other words, there is only one network sharing flag 111-1 stored on the computing device 104-1, which enables sharing of the network data 108-1 with a user account 150 of any user logged into the device. In some devices, the network sharing flag 111-1 is unique to the device and the currently logged-in user. Thus, for example, there may be multiple network sharing flags 111-1 stored on the computing device 104-1, for example one network sharing flag 111-1 for each user account used on the computing device 104-1. Responsive to the user setting the network sharing flag 111-1 to an on state (e.g., setting the flag value to 1, TRUE, ON, ACTIVE, etc.), the connection manager 110-1 may access the network data 108-1 (e.g., via an API) and determine which of the locally stored networks are shareable and send the shareable networks to the server computer 102. The network sharing flag 111-1 may initially have an off state.

The connection manager 110-1 may not share all networks represented in the network data 108-1. For example, unsecured networks, e.g., those that do not require a password, may be disqualified from sharing. As another example, hidden networks may be disqualified from sharing. As another example, inherited networks may be disqualified from sharing. A network is inherited when another user of the device manually adds the network information to the device. A network may be inherited when the network was added to the computing device 104-1 via an enterprise policy, or in other words as part of a setup performed by an enterprise such as an employer, school, or other organization. In some implementations, a policy (rule) may disqualify a network from sharing. In some implementations the API may apply the policy and may not provide the network information when queried via the connection manager 110-1. Implementations may use one or more of these criteria, or other criteria, to disqualify a network from sharing. As another example, a network that has not been accessed for a predetermined period may be disqualified from sharing. For example, if a last connection date is too old (e.g., based on the predetermined period) the connection manager 110-1 may not share the network.

If a network is shareable, the connection manager 110-1 may generate an instance of a network data type for the user. The network data type may be a data type for the user accounts 150. The network data type may store the network data and the last connected timestamp. In some implementations, the instance of the network data type is encrypted. In some implementations, at least some of the network data may be encrypted, e.g., the password and security type, in the instance. Each shareable network in the network data 108-1 may have a respective instance of the network data type. The connection manager 110-1 may send the instance (s) of the network data type to the server computer 102 for storage as part of the user accounts 150, e.g., as part of user account 150-1. The instance then becomes part of the network data 108 for the user and can be shared with other computing devices on which the user logs in.

For example, the same user may also be logged in on computing device 104-2. If the user has not yet enabled network sharing on the computing device 104-2, the network sharing flag 111-2 may have an off state (e.g., have a value of 0, FALSE, OFF, INACTIVE, etc.). If the network sharing flag 111-2 is in an off state, the connection manager 110-2 may not receive the network data 108 or may not do anything with network data 108 if received as part of user account 150-1 from the server computer 102. Once the user activates the network sharing flag 111-2 (or in other words, causes the network sharing flag 111-2 to have an on state), the connection manager 110-2 may receive the network data 108 from the server computer 102, e.g., the network data 108 associated with user account 150-1. If the network sharing flag 111-2 for the computing device 104-2 is already set (has an on state), the connection manager 110-2 may receive the network data 108 from the server computer 102 as part of a user account synchronization process. The synchronizing process may occur at regular intervals and/or in response to certain events. The synchronizing process may occur when the device is turned on. The synchronizing process may occur when the device moves from a sleep or inactive state to an active state.

The connection manager 110-2 may query the network data 108-2, e.g., using an API. The connection manager 110-2 may compare the network information in the network data 108-2 to the networks represented in the instances of the network data type included in the network data 108. If a network instance in the network data 108 is not already saved in network data 108-2 the connection manager 110-2 may add the network data for the network to the network data 108-2. If a network instance in the network data 108 is already saved in network data 108-2 (e.g., both have the same network identifier), the connection manager 110-2 may determine whether or not the network data 108-2 should be updated. For example, if the last connection time in the instance of the network data type of network data 108 is later than the last connection time of the network in the network data 108-2, the connection manager 110-2 may update the network data 108-2 with the information from the instance. This may include updating the last-connection time stamp. This may include updating the password or some other data in the network data 108-2. In this manner the connection manager synchronizes shareable networks with the shared networks represented by the network data 108 for the user account 150-1.

In addition to adding and updating the network information in network data 108-2, the connection manager 110-2 may also add networks (e.g., instances of the network data type) to the network data 108 for the user. For example, the connection manager 110-2 may determine the shareable networks represented in network data 108-2 using similar criteria described with respect to connection manager 110-1. For any shareable network in the network data 108-2 that does not have a matching instance in the network data 108 (e.g., no matching network identifier), the connection manager 110-1 may add a new instance of the network data type and send the new instance to the server computer 102. This new network can then be shared with other devices associated with the user. For example, if the user then logs in to computing device 104-3, and the network sharing flag 111-3 is set, computing device 104-3 may update the network data 108-3 using the network instances in the network data 108 and may likewise add instances based on the network data 108-3.

The server computer 102 may include synchronizer 158. The synchronizer 158 may be configured to ensure that the network data 108 is current. Turning to FIG. 1B, the network data 108 may include several network instances, e.g., instances of a network data type. In the example of FIG. 1B, three network instances are represented, although implementations may have any number of network instances for a user who has consented to network sharing on at least one device. The three network instances are represented by network information 152-1 having last connected timestamp 154-1, network information 152-2 having last connected timestamp 154-2, and network information 152-3 having last connected timestamp 154-3 Other network instances may be associated with other user accounts, e.g., user account 150-2, 150-3, etc.

The synchronizer 158 may update the network instances of network data 108 based on instances received from various computing devices 104 associated with a user account, e.g., user account 150-1. When the synchronizer 158 receives instances from a computing device, the synchronizer 158 may update the network data 108 based on, or subject to, the respective last connected timestamps for the network instances. For example, if the synchronizer 158 determines that a network identifier exists in both the network data 108 and an instance received from a computing device, the synchronizer 158 may use the last connected timestamps to determine whether to replace the instance in network data 108 with the received instance. For example, if the synchronizer 158 receives a network instance with an identifier matching network information 153-3, the synchronizer will keep the network instance with the latest last connection timestamp. In some implementations, if all other information for that network instance is the same, the synchronizer 158 may just update the last connection timestamp 154-3 to be the latest of the two last connection timestamps. In this manner, the synchronizer 158 uses the last connection time stamps to ensure that the network data 108 is up to date. Subsequently, each time a device associated with the user account 150-1 (e.g., computing device 104-1, computing device 104-2, computing device 104-3, etc.) connects to the server it receives a copy of the network data 108 and, if needed, updates the network data stored on the device (e.g., network data 108-1, network data 108-2, network data 108-3, etc.).

Returning to computing device 104-1, some implementations may include cross-device manager 114-1 with a corresponding cross-device interface 116-1. The cross-device manager 114-1 may send queries to a connected device, such as computing device 104-2. For example, if a user has the same user account active on both computing device 104-1 and computing device 104-2, the user may elect to connect the computing device 104-1 (the receiving device) to the computing device 104-1 (the sending device). To connect the receiving device and the sending device, after the user provides a command to connect the two devices, the cross-device manager 114-1 may send a request to the cross-device manager 114-2 of the sending computing device 104-2. The request may be a request for the computing device 104-2 to permit cross-device communications with computing device 104-1. The notification may be received, e.g., via a wireless communication network, such as Wi-Fi, BLUETOOTH, WebRTC, Wi-Fi Direct, or other similar network protocols. In some implementations, the computing device 104-1 may obtain a device identifier for computing device 104-2 from the server computer 102, e.g., from information in user account 150-1. In some implementations, the cross-device manager 114-1 may look for available devices in range of a wireless communication network. In some implementations, the computing device 104-2 may need to be unlocked (e.g., displaying a home screen or an application 130 executing on the device) and have one or more wireless communication networks active (e.g., BLU-ETOOTH on and connected to a Wi-Fi network). The computing device 104-2 may receive the request and display a notification to the user that indicates computing device 104-1 would like to initiate cross-device communications. The notification may include a description of the computing device 104-1. The notification may be an interactive notification. In an interactive notification, the notification includes a control (e.g., button, icon, link, etc.) that, when selected by the user, activates or approves the request. If the user activates/approves the request the two computing devices are capable of being connected for the purposes of the cross-device manager 114-1 and 114-2 and cross-device interface 116-1.

Once connected, the receiving device can receive, at intervals, device status information from the sending device. In some implementations, the receiving computing device 104-1 can send a query 124 to the sending computing device 104-2. The query 124 may be a request for device status information. In some implementations, the sending computing device 104-2 can push the device status information. Device status information includes information about the physical state of the sending device, e.g., computing device 104-2. The device status information may include battery level of the sending computing device 104-2. The device status information may include cellular (or satellite) network strength of the sending computing device 104-2. The device status information may include a description or user-friendly identifier for the sending computing device 104-2. The device status information may include a current sound mode of the sending computing device 104-2. The sound mode represents how the computing device 104-2 announces phone calls, arriving messages and notifications, etc. The sound mode can be one of a ringing/normal mode, a vibrate mode, a mute mode, and a do-not-disturb mode. In a normal (or ringing) mode there are no restrictions on audio/vibration output, so phone calls, messages, application notifications, etc. produce a default sound and/or vibration pattern as determined by the device/application settings. In a vibrate mode, audible output is restricted (not produced) but vibration patterns are provided as determined by device/application settings. In a mute mode, audible output and vibration patterns are restricted, so that no audible sounds or vibration patterns are produced in response to received phone calls, application notifications, communications, etc. A do-not-disturb mode may be a temporary, time-based mute mode, e.g., a mute mode that expires at a specified time. A do-not-disturb mode may allow some sounds/vibrations to be output, e.g., based on the sender of a phone call or notification (e.g., family members). The device status information may also include wireless network connection strength. The device status information may also include other similar information.

The sending computing device 104-2 (e.g., the cross-device manager 114-2) may send metadata 126 that includes the device status information (e.g., battery level, current sound mode, cellular network strength, device description and/or wireless network connection strength, etc.). The device status information in the metadata 126 enables the user to track useful data items without having to retrieve the sending computing device 104-2 and unlock the screen. As one example, a user reading news or email on a laptop/tablet device can check the user's phone battery level before leaving the house for work without having to actually find the phone and wake the phone from a sleep mode. Sending the device status information as metadata offers an improvement over screen mirroring. First, screen mirroring requires the sending device to be unlocked with the display illuminated, whereas receiving device status information as metadata 126 does not require the sending device to be unlocked with the screen illuminated. This saves battery on the sending device while still providing device status information to the receiving device. As another example, sending the device status information as metadata reduces bandwidth usage because the text-based metadata is a smaller data packet than an image or data representing an entire screen. Moreover, the metadata can be sent less frequently, e.g., at predetermined intervals, rather than continuously, which further conserves battery and bandwidth.

Figure 2:
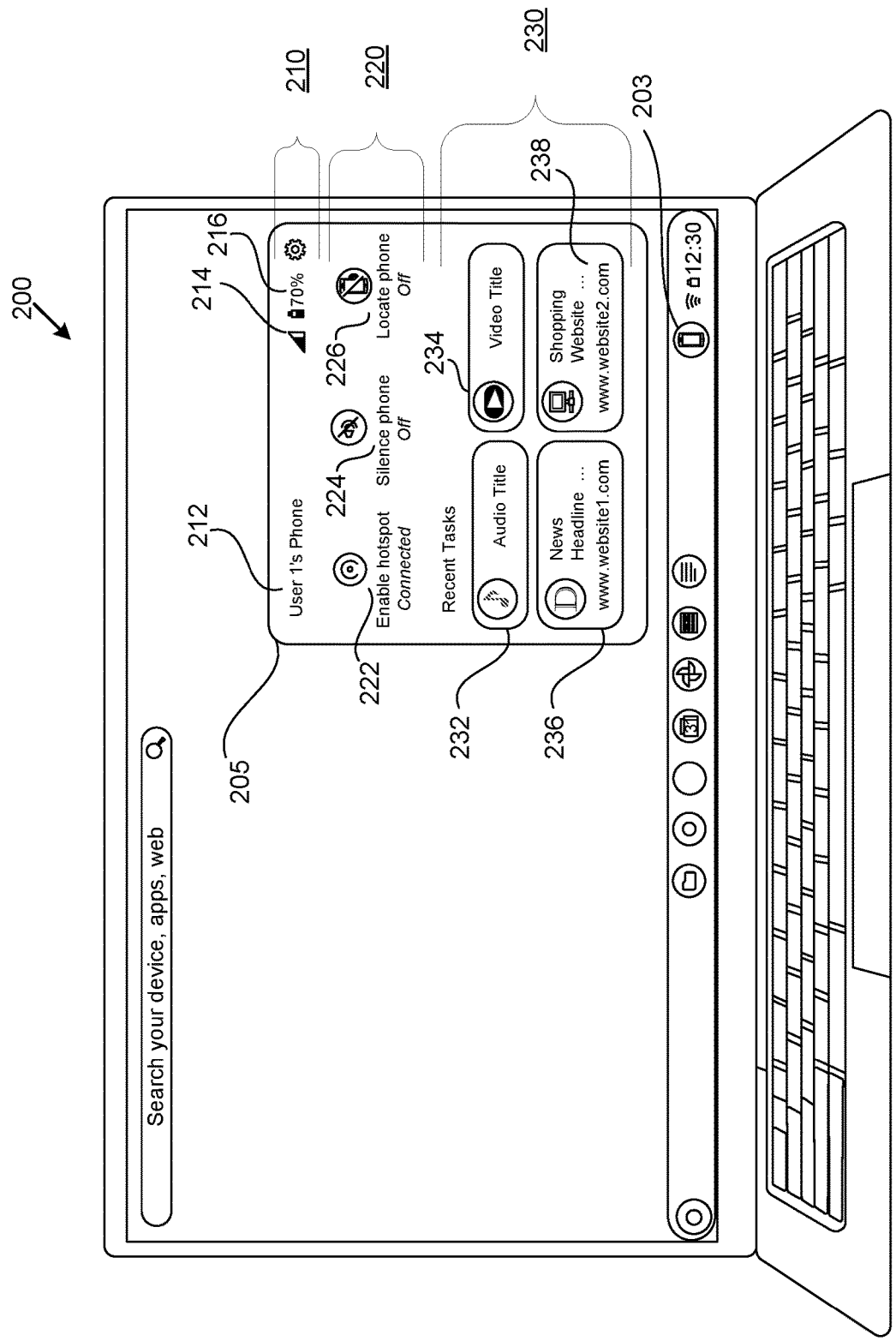
FIG. 2 illustrates a cross-device user interface of a receiving computing device that executes a connection manager according to an aspect.

The cross-device manager 114-1 may receive the device status information as part of the metadata 126 and generate cross-device interface 116-1 that includes device status information 118. The device status information 118 can include a graphical user interface element for each item in the device status information 118. FIG. 2 illustrates an example cross-device interface 205 generated on the receiving computing device 200. In some implementations, a graphical element 203 indicates that the receiving computing device 200 is connected with the sending device and enables a user to minimize the interface 205. The interface 205 of FIG. 2, includes device status information 210. The device status information 210 is an example of the type of information in device status information 118. The device status information 210 of FIG. 2 includes a graphical user interface element 212 that provides a description or a user-friendly (and potentially user-selected) identifier of the sending computing device. The device status information 210 of FIG. 2 includes a graphical user interface element 216 representing the battery level of the sending device. The device status information 210 of FIG. 2 includes a graphical user interface element 214 representing the cellular network strength. Although not shown in FIG. 2, the cross-device interface 205 can include other graphical representations of device status information received from the computing device 104-2. The computing device 104-1 may request the device status information at periodic intervals, e.g., every minute, every five minutes, every ten minutes etc.

In some implementations, the cross-device manager 114-1 may cache the most recent device status information received, e.g., in cross device data 112-1. This enables the computing device 104-1 to still show a cross-device interface 116-1 with device status information 118, although it may be the information last cached, e.g., in cross device data 112-1. This can help the cross-device interface 116-1 start faster without missing graphical elements (e.g., device status information 210).

In some implementations, the cross-device manager 114-1 may receive task status information as part of the metadata and generate cross-device interface 116-1 that includes task items 120. The task items 120 can include a selectable control for each task in the task status information. The task status information enables the user to continue an activity/task on the receiving computing device 104-1 that was started on the sending computing device 104-2. For example, a user may have been reading an article, viewing a web page, or listening to a podcast on her phone while commuting home and, after arriving home, open her laptop and may want to go back to the article/web page or continue listening to the podcast on the laptop. As another example, the task status information can include images recently taken using the sending device. These images may be requested and used at the receiving device. The task status information enables the user to seamlessly continue activities on the receiving computing device.

The interface 205 of FIG. 2, includes task items 230. The task items 230 are an example of task items 120. The task items 230 of FIG. 2 include a task resume control 232 that, when selected by the user, causes the computing device 200 to act on an audio file. The audio file is a type of playable media content, e.g., audio content. Acting on an audio file causes the computing device 200 to open a media/music/audiobook/audio player application and play the audio file. In some implementations, the task information includes a playback start time, so that acting on the audio file causes the media/music player to begin playing the audio file at the playback time. The task items 230 of FIG. 2 include a task resume control 234 that, when selected by the user, causes the computing device 200 to act on a video file. The video file is a type of playable media content, e.g., video content. Acting on a video file causes the computing device 200 to open a media/video player application and play the video file. As with the audio file, the task information may include a playback start time for the video file. The computing device 200 may act on the media content without a further user input being provided at the sending device following the selection of the task resume control 234, or other similar control. That is, selecting the task resume control 234 (or a similar control) causes the computing device 200 to act on the media content, without any requirement for the user to provide a further input at the sending device, for example a further input at a touchscreen of the sending device.

The task items 230 of FIG. 2 include a task resume control 236 that, when selected by the user, causes the computing device 200 to act on a web page. Task resume control 238 similarly causes the computing device 200 to act on a second web page in response to selection by the user. Acting on a web page causes the computing device 200 to open a browser tab in browser application 130-1*b* to the web page. The web page is a type of media content. In some implementations, the task information includes a deep link, so that acting on the web page causes the browser application 130-1*b* to display the web page at the location represented by the deep link. As illustrated in FIG. 2 the task resume controls can include graphical elements (icons, logos, etc.) and text that help the user determine what task will be resumed via selection of the control. Although not shown in FIG. 2, the cross-device interface 205 can include other representations of task status information received from the computing device 104-2, such as image thumbnails, e-book files.

In some implementations, the task status information may be included in metadata 126 in response to an initial query 124 from the requesting computing device 104-1. An initial query may be a query that occurs subsequent to establishing a local connection between the sending device and the receiving device. In other words, an initial query may be the first query received at the sending computing device 104-1 after establishing a local connection with the receiving computing device 104-1. An initial query may be a query 124 that is received after a predetermined interval elapses since the previous query 124. For example, if the receiving computing device 104-1 sends a query 124 every 3 minutes when connected but the sending computing device 104-2 has not received a query in 30 minutes or longer, the query 124 received at the sending computing device 104-2 may be considered an initial query. Implementations may use other intervals. In some implementations, the sending computing device may push the task status information (e.g., without being queried) subsequent to establishing the local connection.

In some implementations, the sending computing device 104-2 may determine which tasks to include in the task status information based on how recently the tasks were performed. In some implementations, the sending computing device 104-2 may send a maximum number of tasks in the task status information. Whether a recently performed action on the sending computing device 104-2 is included in the task status information provided in the metadata 126 may depend on several factors, such as recency of the task, frequency of the task, type of task, etc.

Figure 3:
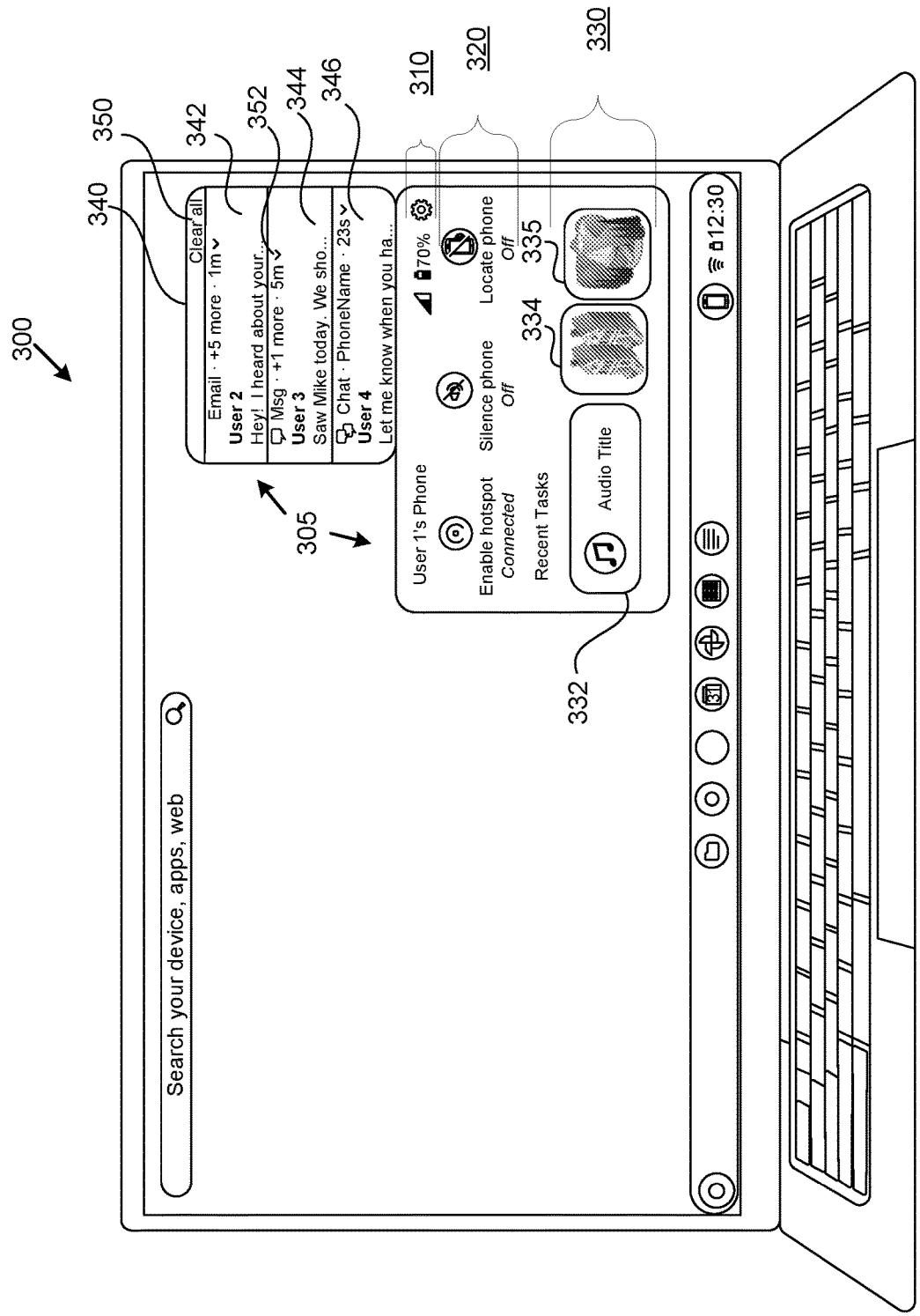
FIG. 3 illustrates a cross-device user interface of a receiving computing device that executes a connection manager according to an aspect.
Figure 4:
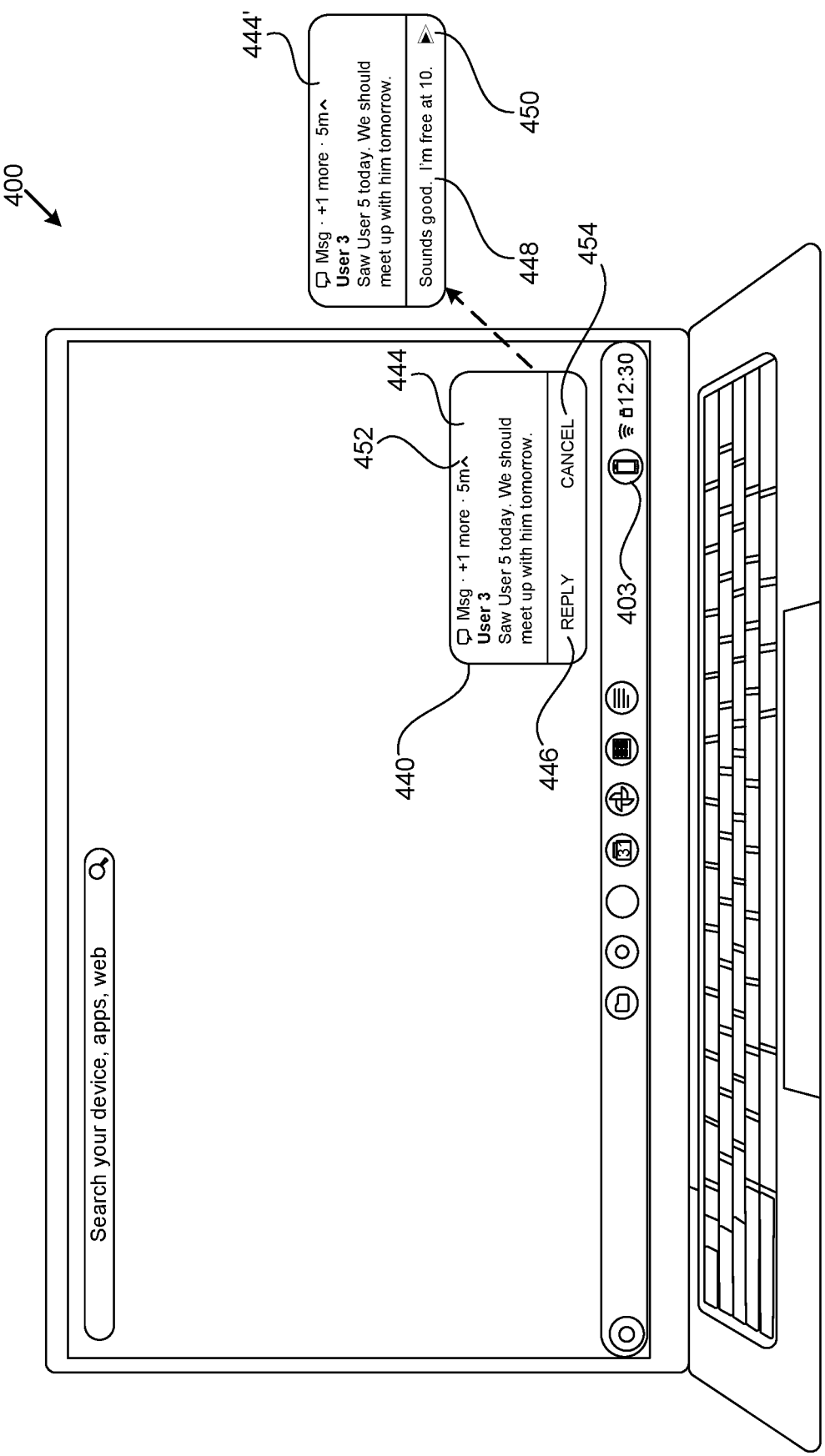
FIG. 4 illustrates a cross-device user interface of a receiving computing device that executes a connection manager according to an aspect.

In some implementations, the cross-device manager 114-2 may send/push conversation notifications to the receiving device 104-1. Conversation notifications are notifications that can accept a reply. Conversation notifications do not include app notifications that do not accommodate a reply. Thus, conversation notifications include email, texts, social media posts, etc. In response to receiving a conversation notification, the cross-device manager 114-1 may generate conversation notifications 113 in cross-device interface 116-1. The conversation notifications 113 can include a text area to display the incoming conversation notification and a reply line for responding to the conversation notification. In some implementations, the conversation notifications 113 may include a control (button, icon, link, etc.) for clearing the notification without responding. Clearing a notification in the cross-device interface 116-1 may clear the notification on the sending computing device 104-2. The clearing of or reply to a conversation notification may be communicated via the local connection. FIGS. 3 and 4 illustrate a cross-device interface with conversation notifications pushed from the sending device and are discussed in more detail below. The conversation notifications 113 enable a user to see notifications likely to be of more importance to the user and provides an opportunity to reply or clear the notifications without having to find and activate (unlock) the sending device.

In some implementations, the cross-device interface 116-1 may include cross-device controls 122. The cross-device controls 122, when selected, cause the cross-device manager 114-1 to send an instruction to the sending computing device 104-2 that modifies a setting on the sending computing device 104-2. Modifying the setting can include changing a sound mode, overriding a sound mode, activating an audible output, turning on or off a light, initiating a hot spot, turning on airplane mode, etc. The cross-device controls 122 can include a selectable control (button, icon, link, etc.) for each setting changeable from the receiving computing device 104-1.

The interface 205 of FIG. 2, includes cross-device controls 220. The cross-device controls 220 are an example of some of the cross-device controls 122. The cross-device controls 220 of FIG. 2 include an enable hotspot control 222 that, when selected by the user, causes the computing device 200 to send an instruction to the sending device (e.g., User 1's Phone) to activate a hot spot. In some implementations, activating the hot spot may include turning on the receiving device's hot spot setting. In some implementations, activating the hot spot may include generating a unique SSID and password at the sending device, which is shared with the receiving device via the local connection (which may be or include a peer-to-peer connection), which enables the receiving device to establish a connection with the sending device's cellular network data network connection. The example interface 205 also includes silence control 224. The silence control 224, when selected, sends an instruction to the sending computing device to change/override the current sound mode to enter a mute mode. This control, for example, enables a user to silence their phone remotely. For example, a user may be in a teleconference using a laptop or tablet when the user's phone starts ringing. Selection of control 224 enables the user to silence the phone without having to locate the phone or otherwise disrupt the teleconference. As another example, the user may use silence control 224 to change the sound mode to silence the phone's notifications (e.g., activating/turning on a do-not-disturb mode or a mute mode) so the user can focus on work performed at the laptop/notebook. In some implementations, this change may last until the user actively changes the sound mode to another mode. In some implementations, the silence control 224 does not change the sound mode but may cause the second device to stop outputting sound, e.g., stop a ringtone. In other words, the change in the sound mode may be a temporary override of the sound mode (e.g., for a limited time).

The example interface 205 also includes device location control 226. Device location control 226, when selected, sends an instruction to the sending computing device to initiate audible output, such as a ringtone, alarm, playing music, etc. Initiating the audible output is done regardless of the current sound mode or other sound settings on the sending device. Thus, for example, the instruction can cause the sending device to ring even if the sending device is in a mute mode or do-not-disturb mode. Accordingly, as one example, the device location control 226 enables the user to find the user's phone from the user's laptop/notebook computer. The cross-device controls 122 may include other controls not illustrated in the example interface 205. For example, the cross-device controls 122 may include a control that, when actuated, sends an instruction to the sending device to stop pushing conversation notifications. As another example, the cross-device controls 122 may include a control that, when selected by the user, sends an instruction to the sending device to turn on the flashlight. As another example, the cross-device controls 122 may include a control that, when selected by the user, sends an instruction to the sending device to put the sending device into airplane mode. The cross-device controls 122 may include a control that, when selected by the user, sends an instruction to the sending device to access an image repository (e.g., camera roll or gallery) on the sending device. The cross-device controls 122 may include a control that, when selected by the user, sends an instruction to the sending device to place, answer, or transfer an ongoing audio (phone) or video call. The cross-device controls may include a control that, when selected by the user, sends an instruction to the sending device to return content (all content or a portion of the content) in the clipboard on the sending device. The cross-device controls 122 may include a control that, when selected by the user, sends an instruction to the sending device to send all notifications, rather than just conversational notifications, to the receiving device. The cross-device controls 122 may include a control that, when selected by the user, sends an instruction to the sending device to enable/answer streaming conversations when a notification is selected.

Returning to FIG. 1A, the computing device 104-1 may include applications 130-1. The applications 130-1 may be any type of computer program that can be executed/delivered by the computing device 104-1. An application of applications 130-1 may provide a user interface (e.g., application window) to allow the user to interact with the functionalities of a respective application 130-1. The application window of a particular application 130-1 may display application data along with any type of controls such as menu(s), icons, widgets, etc.

The applications 130-1 may include browser application 130-1*a*. A browser application 130-1*a* is a web browser configured to access information on the Internet. The browser application 130-1*a* may launch one or more browser tabs in the context of one or more browser windows. The applications 130-1 may include other applications, such as application 130-1*b*. For example, application 130-1*b* may be a web application program that is stored on a remote server (e.g., a web server) and delivered over the network 160 through a browser tab. In some examples, the web application may be a progressive web application, which can be saved on the device and used offline. The application 130-1*b* may include non-web applications, which may be programs that are at least partially stored (e.g., stored locally) on the computing device 104-1. In some examples, non-web applications may be executable by (or running on top of) the operating system 106-1, such as cross-device interface 116-1.

The applications 130-1 may include native applications. A native application is a software program that is developed for use on a particular platform or device. In some examples, a native application is a software program that is developed for multiple platforms or devices. In some examples, a native application is a software program developed for use on a mobile platform and also configured to execute on a desktop or laptop computer. In some examples, native applications include Android Runtime for Chrome (ARC) applications. In some examples, a native application includes a Linux application (or sometimes referred to as a Crostini application).

FIG. 3 illustrates a cross-device user interface 305 of a receiving computing device 300 that executes a connection manager according to an aspect. The computing device 300 may be an example of the computing device 104-1 of FIG. 1A and may include any of the details discussed with reference to that figure. As shown in FIG. 3, the user interface 305 includes cross-device controls 320, which are similar to cross-device controls 220 described with respect to FIG. 2. The user interface 305 also includes device status information 310, which is similar to device status information 210 described with respect to FIG. 2. The user interface 305 also includes task items 330. Like task items 230 of FIG. 2, the task items 330 include a task resume control 332 that, when selected by the user, causes the computing device 300 to act on an audio file.

In addition, the task items 330 of FIG. 3 include thumbnail control 334 and thumbnail control 335 that, when selected by the user, causes the computing device to request a full image that corresponds to the thumbnail from the sending device. Thus, the user is able to act on an image (e.g., saving the image, attaching the image, pasting the image, etc.). Although the user interface 305 illustrates one image, any number of thumbnails may be displayed. In some implementations, a predetermined number (which may be configurable by the user) may be included in the user interface 305. In some implementations, the user interface 305 may include a control that enables the user to request additional thumbnails. For example, the sending device may provide the most recently taken or accessed four images and the user interface 305 may include a control for requesting the next four images from the sending device.

In addition, the user interface 305 of FIG. 3 includes a notification interface 340. The notification interface may display conversation notifications received (pushed from) the sending device (e.g., User 1's Phone). The notification interface 340 may not display all notifications displayed on the sending device. Instead, the sending device may select certain notifications to push, e.g., notifications that have a capability of being replied to, certain system notifications, conversation notifications from specific senders, conversation notifications from specific applications, etc.

In the example of FIG. 3, the notification interface 340 includes three recent conversation notifications, e.g., 342, 344, and 346. Each conversation notification may include an indication of the application used to receive the conversation notification on the sending device. In this example, conversation notification 342 may include an envelope icon and a title indicating the conversation notification 342 was received in an email application, while communication 346 may include an icon and description that indicates the conversation notification 342 was received in a chat application. The conversation notifications may also include additional metadata, such as a notification identifier, a preview of the communication, an indication of freshness, or in other words how long ago the conversation notification was received at the sending device or pushed from the sending device. For example, in the notification interface 340 the conversation notifications illustrated have a freshness indication of 1 minute, 5 minutes, and 23 seconds. In some implementations, a conversation notification may disappear after the freshness (e.g., time since receipt) reaches a threshold, e.g., 3 minutes, 5 minutes, 10 minutes, etc. If no conversation notifications fall within the freshness threshold the system may not display a notification interface 340 as part of the user interface 305. The threshold may be a system setting and in some implementations the user may change the system setting.

In some implementations, conversation notifications are included in the notification interface 340 until cleared. In some implementations, information from a second conversation notification from the same source may replace currently displayed information from a currently displayed conversation notification. For example, the conversation notification 342 from the email application may represent a most recently received email communication and the conversation notification 342 may provide an indication (e.g., "+5 more") of the number of other conversation notifications received but not cleared. In some implementations, the notification interface 340 may include a control 350 for clearing the conversation notifications. Clearing the conversation notifications, e.g., via selection of the control 350 by the user, may remove the notification interface 340 from the display. The conversation notifications, e.g., 342, 344, 346, may be selectable or may include a selectable element (e.g., control 352 of conversation notification 344). The selection of the conversation notification or the selectable element (e.g., conversation notification 344 or control 352) may expand the conversation notification so the entire text of the communication is visible.

While FIG. 3 is illustrated on a laptop/notebook computing device, the cross-device interface 305 can be implemented on other computing devices, such as a smart phone or tablet. Thus, a smartphone may be a receiving device and a tablet or a laptop can be a sending device. In some implementations, two locally connected devices may each act as a sending device and as a receiving device. In general, cross-device interface 305 and similar interfaces can be used to improve cross-device functionality between any two computing devices.

FIG. 4 illustrates an example expanded conversation notification 444 in a notification interface 440. The example expanded conversation notification 444 is an example of the result of selection of the control 352 (or the conversation notification 344) of FIG. 3. In some implementations, the expanded conversation notification 444 may include a control 454 (button, icon, link) that, when selected by the user, clears the conversation notification, which removes the conversation notification from the user interface, e.g., notification interface 440 or notification interface 340. Clearing the conversation notification also includes sending instructions to the sending device to also clear the notification on that device as well. The instructions include an identifier for the notification, and responsive to receiving the instructions, the sending device may request the notification framework (e.g., of the operating system) to remove the notification with the notification identifier. In some implementations, notification interface 440 includes a control 452, which changes the display of the conversation notification from the expanded conversation notification 444 to a collapsed conversation notification, like conversation notification 344. In some implementations, the expanded conversation notification 444 may also include a control 446 that, when selected by the user, enables the user to respond to the notification. Expanded conversation notification 444' illustrates an example conversation notification that enables the user to reply. Put another way, if a user selects control 446, the system may replace expanded conversation notification 444 with expanded conversation notification 444'.

In some implementations, expanded conversation notification 444' is the default expanded conversation notification. In other words, in some implementations the system may display expanded conversation notification 444' rather than displaying expanded conversation notification 444. In some implementations (not shown), the expanded conversation notification 444' may also include control 454 for clearing the notification on the sending and the receiving devices. The expanded conversation notification 444' includes a reply area 448 and a send control 450. The send control 450, when selected by a user, causes the receiving device to send the reply provided in the reply area 448 to the sending device, along with the notification identifier. Responsive to receiving the reply and notification identifier, the sending device may provide the reply to the application that generated the application notification. In some implementations, replies may be handed to the notification framework. In some implementations, expanded conversation notification 444 (or 444') may be displayed even with another portion of the user interface for the connection manager (e.g., 305, 205) hidden. In some implementations, the user can select the graphical element 403 to make the other portion visible. The graphical element 403 indicates that the receiving device 400 is connected with the sending device and may be selectable to alternatively minimize or maximize portions of the user interface for the connection manager.

FIG. 5 illustrates an on-boarding user interface 505 of a sending computing device 500 that executes a connection manager according to an aspect. The sending computing device 500 may be an example of the computing device 104-2 of FIG. 1A and may include any of the details discussed with reference to that figure. On-boarding refers to the process of setting up the sending computing device 500 so that the cross-device communications (such as receiving and responding to queries for device status information, pushing conversation notifications, and acting on received instructions for changing system settings, etc.) operate. A successful on-boarding process results in the execution of the cross-device manager on the sending (and the receiving) devices. As part of the on-boarding process, the sending device may receive a notification that the receiving device, identified by identifier 515, has requested a cross-device connection. The notification may also include a control 510 for accepting the invitation. Selection of the control 510 may result in the sending computing device 500 activating the cross-device manager.

FIG. 6 illustrates a notification 660 on a computing device 600 that indicates the computing device 600 is connected with a receiving computing device according to an aspect. Thus, in the example of FIG. 6 the computing device 600 may have a sending device role. The computing device 600 may be an example of the computing device 104-2 of FIG. 1A with the cross-device manager active and may include any of the details of any of the computing devices 104 of FIG. 1A. As shown in FIG. 6, the notification 660 provides an indication to the user that the computing device 600 is in-range of the receiving device and that metadata, e.g., device status information, conversation notifications, task status information, and cross-device instructions is being exchanged with the receiving device.

Figure 7:
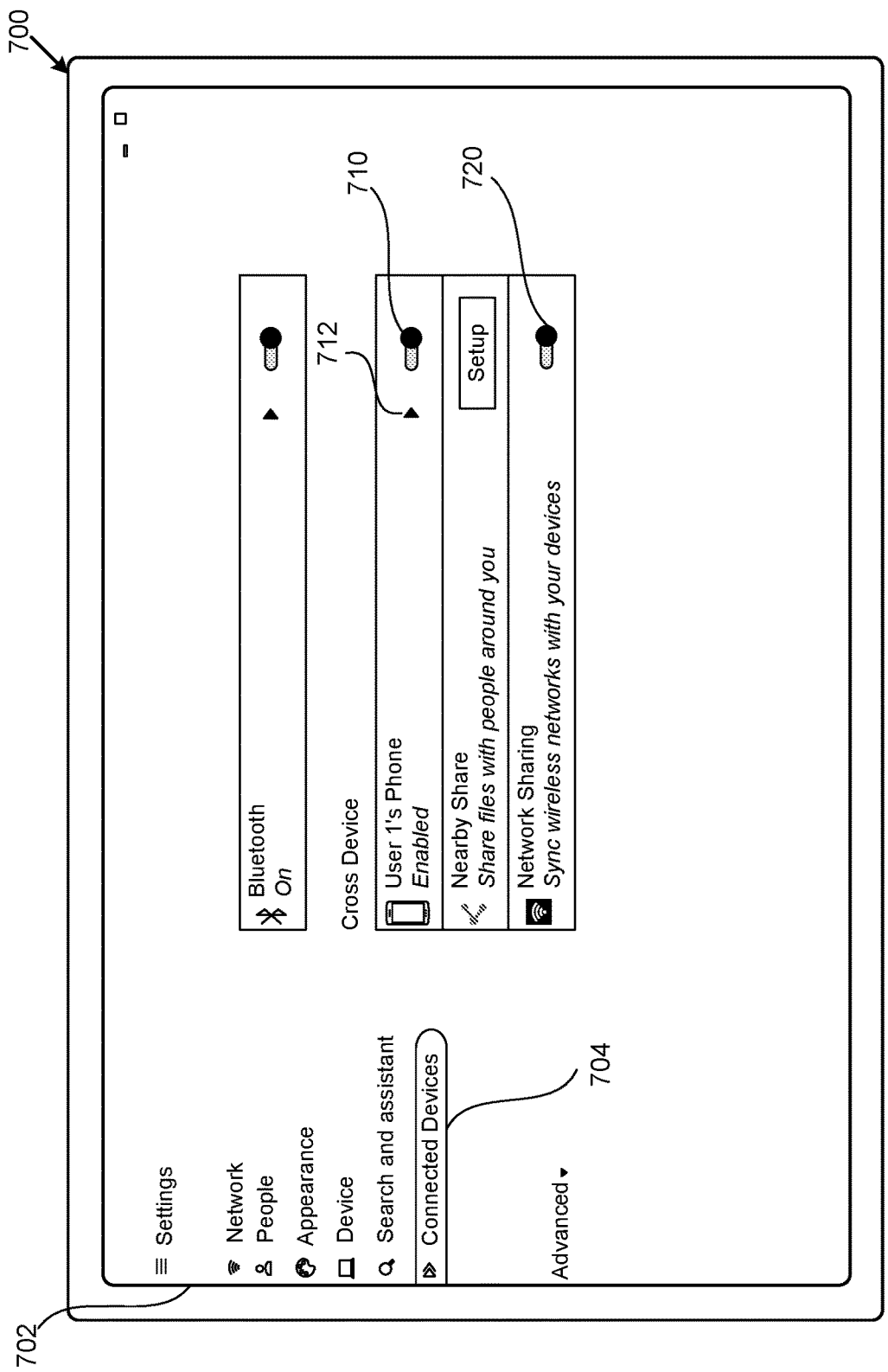
FIG. 7 illustrates a settings user interface of a receiving computing device for enabling and configuring a connection manager and cross-device manager according to an aspect.

FIG. 7 illustrates a settings user interface 702 of a receiving computing device 700 for enabling and configuring a connection manager and/or a cross-device manager according to an aspect. The computing device 700 may be an example of the computing device 104-1 of FIG. 1A and may include any of the details of FIG. 1A. The user interface 702 may be a systems settings interface. In the example of FIG. 7, the user interface includes connected device settings 704. The connected device settings include cross device settings. The cross device settings include a cross-device manager control 710 configured to activate or deactivate the cross-device manager. In the example of FIG. 7, the cross-device manager control 710 indicates that the cross-device manager is active and will connect with the sending device (e.g., User 1's Phone) when the sending device is in range. The interface 702 also includes a control 712 that, when selected by the user, initiates display of a second user interface for configuring the cross-device manager. The example interface 702 also includes control 720 configured to change (e.g., set or clear) the network sharing flag. In the example of FIG. 7, the control 720 indicates that the network sharing flag is set (has an on state), so that the receiving device 700 is sharing wireless networks with the user's account and will update the network data with instances of the network data type associated with the user account, e.g., at a server. Because each computing device has at least one network sharing flag, a user actuating the control 720 changes (toggles) the network sharing flag on the device but does not affect other devices associated with the user. In other words, the network sharing flag on the device is not synchronized with the user account information at a server (e.g., server 102 of FIG. 1).

Figure 8:
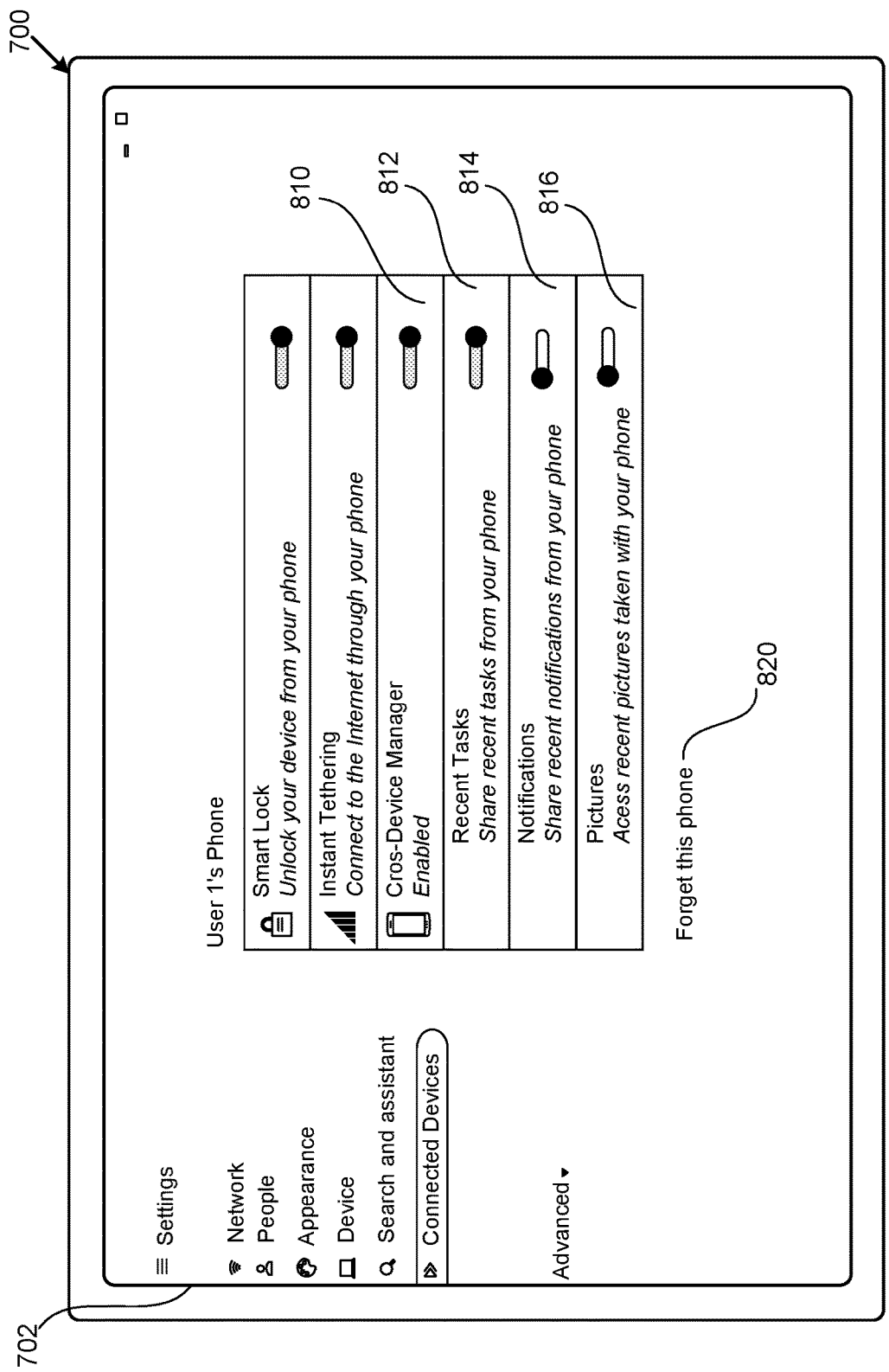
FIG. 8 illustrates a settings user interface of a receiving computing device for configuring cross-device options of a connection manager according to an aspect.

FIG. 8 illustrates the settings user interface 702 of the receiving computing device 700 triggered by user selection of control 712 of FIG. 7. The user interface 702 of FIG. 8 may be used for configuring cross-device options of a cross-device manager according to an aspect. For example, the user interface may include a cross-device manager control 810 configured to activate or deactivate the cross-device manager, like cross-device manager control 710. In the example of FIG. 8 the cross-device manager control 810 indicates the cross-device manager is activated. In some implementations, changing the cross-device manager setting, e.g., by toggling the cross-device manager control 810, may cause the second device, e.g., User 1's Phone in the example of FIG. 8, to receive the updated setting. In one implementation, the cross-device manager setting may be a user account setting. In such an implementation, changing the cross-device manager setting may update a user profile, e.g., user account 150-1 on server 102 of FIG. 1. The cross-device manager setting may eventually be received by the second device via a synchronization of the user profile. In some implementations, changing the cross-device manager setting, e.g., via cross-device manager control 810, may send a cross-device instruction to the sending device that includes the updated value of the cross-device manager setting. In either implementation, the sending device receives the updated cross-device manager setting. If the cross-device manager setting indicates the cross-device manager is off, the receipt of the updated setting alerts the sending device that it is disconnected, and the sending device may inactivate the connection manager, which means the sending device may no longer try to use the features of the connection manager. In some implementations, the device connection manager setting may be for a pair of devices, so that disconnecting from one receiving device may not disconnect the sending device from a different receiving device.

In some implementations, the user may customize the metadata shared between the sending and receiving devices connected via the cross-device manager. For example, some implementations may include control 814, configured to activate or deactivate the sharing (pushing) of communications from the sending device to the receiving device. In the example of FIG. 8, the control 814 indicates that the sharing of conversation notifications is deactivated. This means that the connection manager of the sending device will not push conversation notifications to the receiving device. A user of the receiving computing device 700 may activate the sending of conversation notifications by actuating (toggling, sliding) the control 814. Similarly, the example of FIG. 8 includes control 812, configured to activate (set) or deactivate (cancel) the sharing of tasks, e.g., recent tasks, from the sending computing device. In the example of FIG. 8, the control 812 indicates that task information is shared from the sending computing device to the receiving computing device, so that recent tasks are shared. In some implementations, the settings user interface of FIG. 8 may include control 816, configured for activating and deactivating the sharing of images from the sending device to the receiving device. In the example of FIG. 8, control 816 indicates images (e.g., pictures or videos taken on the sending device) are not shared. Thus, the sending device may not provide thumbnail images of recent images taken on the sending device to the receiving device. In one example, modifying the setting of one or more of controls 812, 814, and 816 in the user interface 702 may result in update of user account information. In one example, user profile information (e.g., user account 150-1) may store the current settings of one or more of the cross-device options.

Changes to the settings of a particular cross-device option may be received by other devices on which the user is logged in. Thus, the sending device may receive the updated cross-device options via updated user profile information, e.g., when a connection is established with the sending device. In another example, the cross-device options may be communicated to the sending device responsive to establishing a local connection with the sending device. Thus, in establishing a local connection, the sending device (e.g., User 1's Phone in the example of FIG. 8) may align the settings of the connection manager on the sending device with those on the receiving device. Thus, for example, activating the recent tasks via control 812 will result in activating the recent tasks on the sending device as well. This occurs without any further user input. Using controls 812, 814, and 816 the user can configure the type of metadata shared from the sending device to the receiving device. In some implementations, a forget control 820 may be provided. The forget control 820 may deactivate the cross-device manager and delete any information stored at the receiving computing device 700 that enables the cross-device manager to connect with the sending device.

Figure 9:
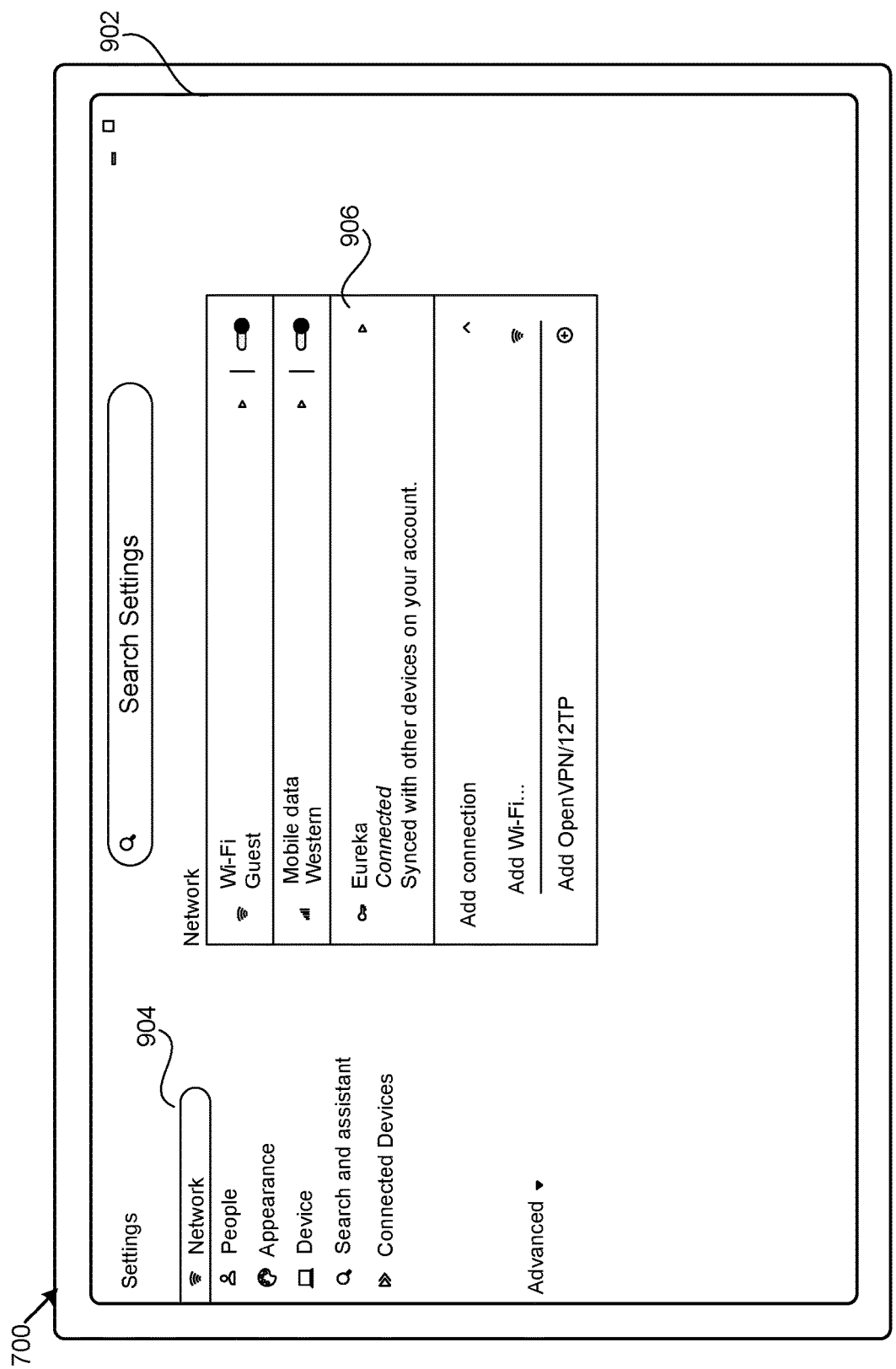
FIG. 9 illustrates a settings user interface of a computing device that displays a notification indicating that a local network is shared with other devices according to an aspect.

FIG. 9 illustrates a settings user interface 902 of the computing device 700 that displays a notification 906 indicating that a local network is shared with other devices according to an aspect. The user interface 702 may be a systems settings interface. In the example of FIG. 9, the user interface 702 includes network settings 904. The network settings may be configured to display information about wireless networks stored on the computing device 700, e.g., similar to network data 108-1. In the example of FIG. 9. The information may include a connection status of a network and a notification 906 that the network is being shared with other devices associated with the user account. FIG. 10 illustrates a settings user interface 1002 of a computing device 1000 that displays a notification 1006 indicating a local network is shared with other devices according to an aspect. The user interface 1002 may be a systems settings interface. In the example of FIG. 10, the user interface 1002 includes a notification 1006 that provides the sharing status of the network. Because the network information is being shared, this indicates that the network sharing flag for device 1000 has an on state, or in other words has a value (e.g., 1, TRUE, ACTIVE, etc.) indicating sharing is active.

FIG. 11 illustrates a notification 1160 on a computing device 1100 that indicates the network sharing status for the device is active according to an aspect. The computing device 1100 may be an example of the computing devices 104 of FIG. 1A and may include any of the details of FIG. 1A. The notification 1160 may be generated by the operating system and may provide an indication to the user that the computing device 1100 is sharing network information stored on the device 1100. For example, the device 1100 may determine which of the networks stored locally on the device 1100 in the network data are shareable and may generate an instance of the network data type in user account data and send the instance(s) to a user account server, where the server will ensure that the user account is associated with the most up to date network information available. The server can then share the network information (settings) with other devices associated with the user account as disclosed herein.

Figure 12:
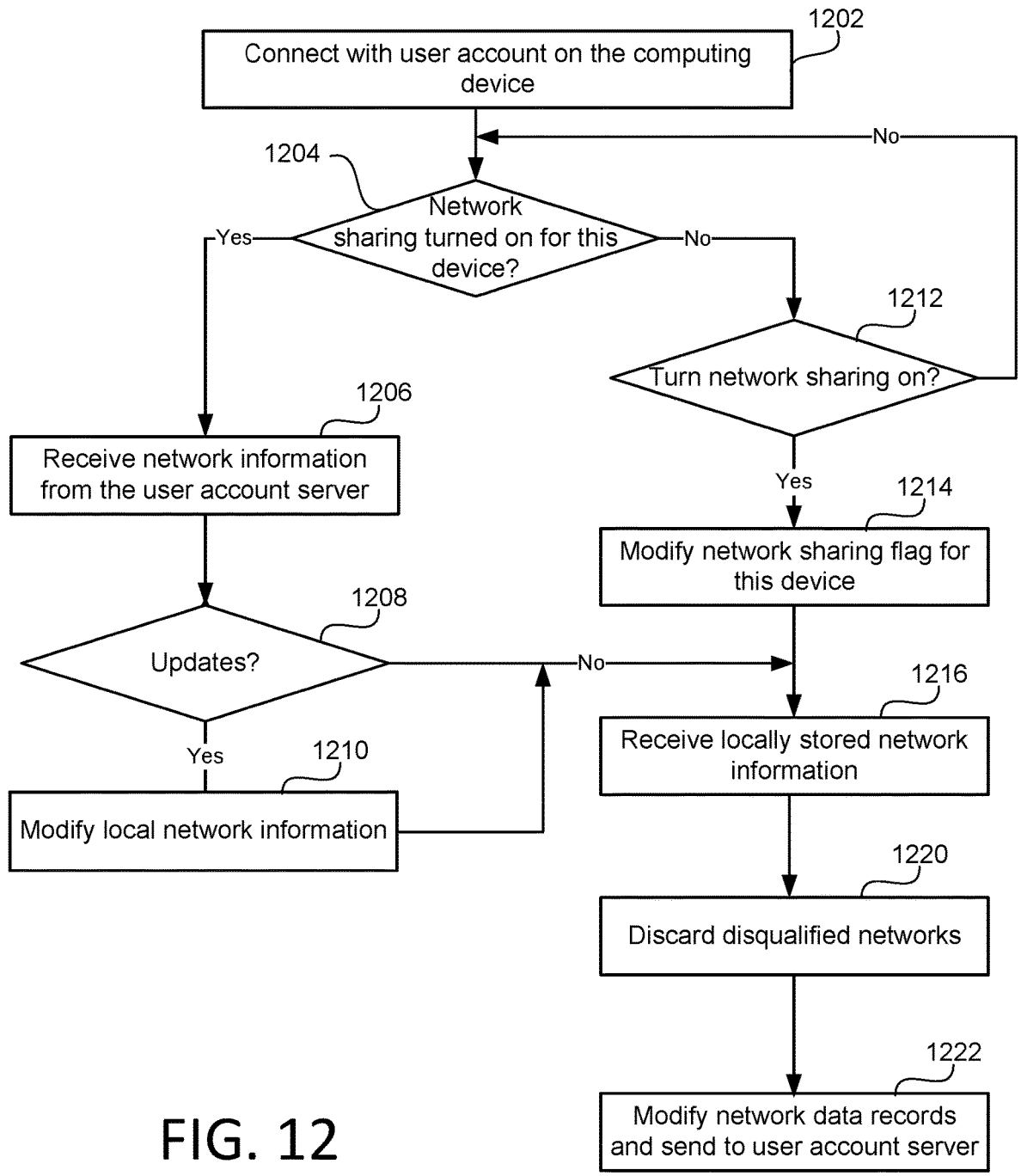
FIG. 12 is a flowchart depicting example operations of sharing network settings across devices according to an aspect.

FIG. 12 is a flowchart depicting an example process 1200 for sharing network settings across devices according to an aspect. Although the process 1200 of FIG. 12 is explained with respect to the system 100 of FIGS. 1A and 1B, the process 1200 may be applicable to any of the embodiments discussed herein. Although process 1200 of FIG. 12 illustrates the operations in sequential order, it will be appreciated that this is merely an example, and that additional or alternative operations may be included. Further, operations of FIG. 12 and related operations may be executed in a different order than that shown, or in a parallel or overlapping fashion.

Operation 1202 includes a user connecting to the user's account (e.g., 150-1) on a computing device. In some implementations, operation 1202 may be performed automatically each time the device is started or each time the device moves from a sleep to an awake mode. In some implementations, the connecting is performed periodically or at an interval, so that user settings and data can be synchronized. Once the device is connected with the user account operation 1204 determines, at the computing device, whether the user's network sharing flag, e.g., network sharing flag 111-1, is set (has an on state) or cleared (has an off state) (1204). In some implementations, the device may have one network sharing flag, which applies to a primary user account. In some implementations, the device may have one network sharing flag for each user account associated with the device. In some implementations, whether the device stores one network sharing flag for the primary user or one network sharing flag for each user may be determined by the type of device. For example, a smart phone or wearable device (glasses, watches, etc.) are devices much less likely to be used by multiple users than a laptop, tablet, notebook, desktop, etc., and may therefore have one network sharing flag. The network sharing flag (or flags, depending on the implementation) may be local to the computing device and may not be synchronized with user account information for the user account on a server, e.g., may not be synchronized with the user's account on server 102.

If the network sharing flag has an off state, e.g., indicating the user has not yet opted to share wireless network information from this device (1204, No), the device may wait for the user to turn network sharing on (set the network sharing flag to the on state) as part of operation 1212. For example, the system may detect an interaction with a user interface element (e.g., control 720 of FIG. 7) that sets the network sharing status to the on state. In some implementations, turning the network sharing on may be performed via a settings interface, such as via control 720 of user interface 702. In some implementations, the device may present a notification or a shortcut that enables the user to turn network sharing on. Once the user opts to set the network sharing flag for the device (1212, Yes), operation 1214 updates the network sharing flag on the device. The network sharing flag may be stored as part of the device for the device and networks may be shared via a primary user account. For some devices, the network sharing flag may be stored as part of the user settings for the device and networks may be shared via the user account associated with the user settings. The user account used to share the network information is referred to as the sharing account or primary user account.

If the network sharing flag is set, e.g., indicating the primary user has opted to share wireless network information from this device, operation 1206 may include getting network information from the user account server, for example network data 108 from user account 150-1 on server computer 102 of FIG. 1A. The network data may be in the form of a network data type stored as part of the user account. The network data type may be encrypted. The network data type may be partially encrypted. The network data type may include multiple instances, each representing a separate network. In some implementations, if the device is the receiving device on which the user set the network sharing flag, there may be no instances of the network data type stored as part of the user account. The network data type instances may store details about a wireless network that identifies the network and enables a device to connect to the network. The network data type instances also store a last connection timestamp. The last connection timestamp is used to resolve conflicts when synchronizing the network data between devices connected with the user account.

Operation 1208 checks the network data received from the user account server against the network data stored at the device. If no instances are associated with the user account net, there are no updates (1208, No). If there are instances of the network data type, operation 1208 compares the network identifiers in the instances against the network identifiers stored at the local device. In some implementations, this may include decrypting the instances. If no network identifiers match, there are updates (1208, Yes) because the system can add the networks represented by the instances of the network data type to the networks stored on the device. If a network identifier from the instances matches a network identifier of a network stored on the device, operation 1208 may include comparing the network information used to connect to the network (e.g., password, a different security type) to determine if differences exist. Differences in information used to connect to the network represent a network discrepancy. If a network discrepancy exists, there are updates (1208, Yes). In some implementations, operation 1208 may include determining, for a network having a network discrepancy, whether the last connection timestamp of the network information stored locally is later than the last connection timestamp of the network information from the network data type received from the server. If the locally stored network information has a later last connection timestamp, there is no update for this network.

Operation 1210 modifies the local networks, including adding new networks or updating existing networks. If not already performed as part of operation 1208, operation 1210 may include determining whether the last connection timestamp of the locally stored network is later than the last connection timestamp of the instance in the network data type (e.g., from the user account server). If it is later, no update is needed to the local network information.

Operation 1216 includes obtaining network information from the device, referred to as locally stored network information. In some implementations, the network information may be obtained via an API, e.g., an operating system API. Operation 1220 may include determining disqualified networks from the locally stored network information. In some examples, operation 1220 may use one or more tests for determining whether to disqualify a network. For example, a network may be disqualified if it is marked or indicated as a hidden network on the device. As another example, a network may be disqualified if it is an unsecured network. A network is unsecured if the network does not require a password for connection. As another example, a network may be disqualified if the network was added by another user on a device likely to be used by different users. For example, if the device stores a network sharing flag for more than one user, a network added by another user may be disqualified. As another example, a network may be disqualified by a policy. For example, if a network is added to a device as part of an enterprise setup (e.g., by an enterprise policy) the network may be disqualified from sharing. In some examples, the network information may include an indication, flag, data element, etc., disqualifying the network from sharing. For any networks not disqualified, operation 1222 includes generating instances of the network data type as part of user information sent to the user account server. The instances include a last connection timestamp from the local network information. The instances are sent to a user account server, e.g., server computer 102 of FIG. 1A.

It is understood that portions of process 1200 may occur periodically, and that the different portions may not occur at the same period or interval. For example, operations 1206 to 1210 may be repeated at a first interval while the device is active, where operations 1216 to 1222 may be repeated at a second interval while the device is active. In this manner a user device can receive periodic updates from the server (e.g., operations 1206 to 1210) at the first interval and provide periodic updates to the server (e.g., operations 1216 to 1222) at the second interval. Providing periodic updates and receiving periodic updates occurs when the network sharing flag is set for the device or for device/user, depending on the implementation. Furthermore, the user may opt to turn off network sharing, e.g., setting the network sharing flag to an off state (e.g., clear the network sharing flag) for the device (or device/user combination, depending on the device's setup) at any time. For example, the device may detect an interaction with a user interface element, such as control 720, that sets the network sharing status to the off state. Once the network sharing flag is cleared (set to the off state) the device no longer provides periodic updates and does not receive or does not act on the periodic updates.

Figure 13:
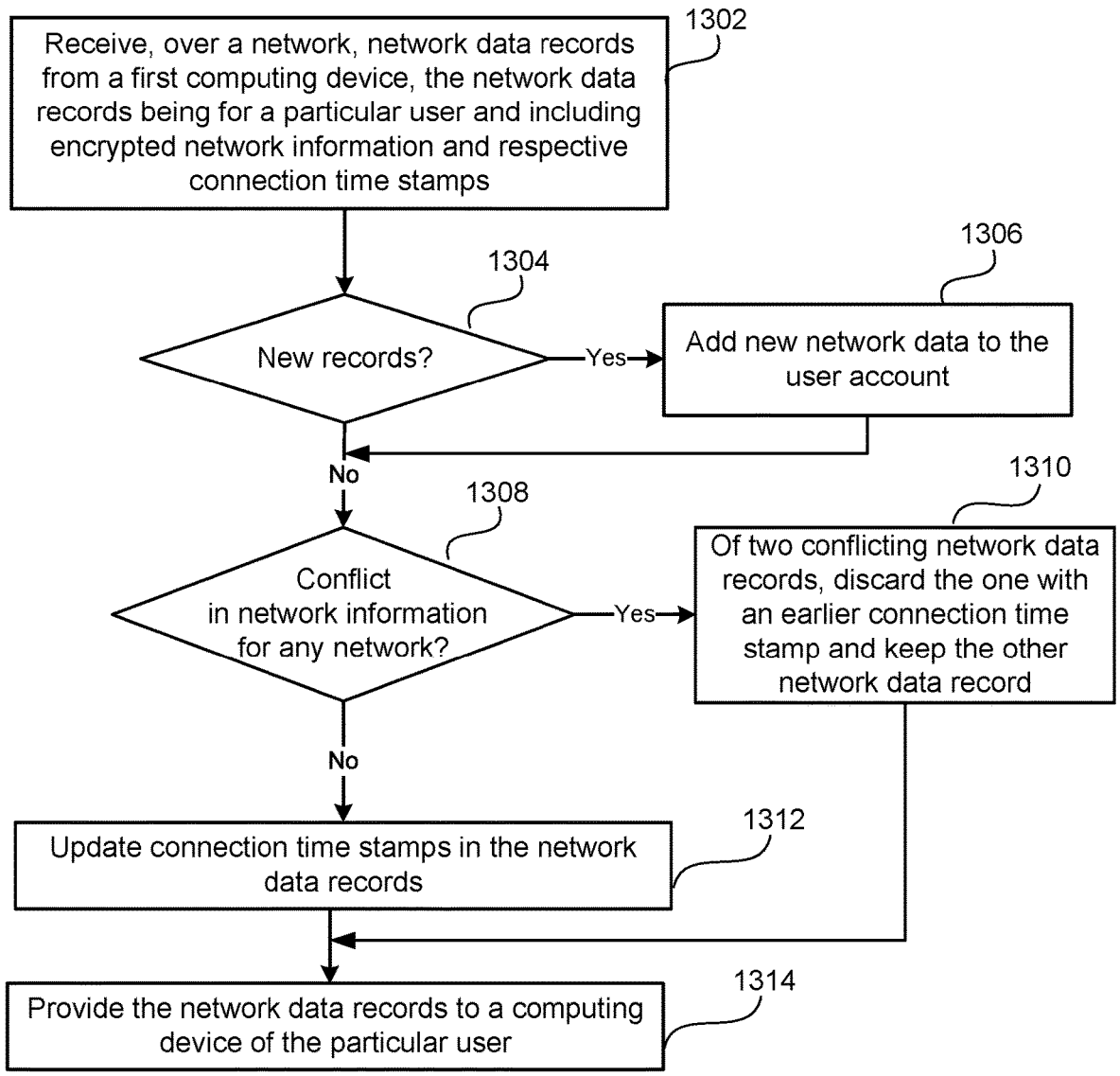
FIG. 13 is a flowchart depicting example operations of maintaining shared network settings for a user according to an aspect.

FIG. 13 is a flowchart depicting an example process 1300 for maintaining shared network settings for a user according to an aspect. In some implementations, process 1300 may be performed by a user account server, such as server computer 102 of FIG. 1A. In some implementations, process 1300 may be performed by computing devices, such as device 104-3 of FIG. 1A. Although the process 1300 of FIG. 13 is explained with respect to the system 100 of FIGS. 1A and 1B, the process 1300 may be applicable to any of the embodiments discussed herein. Although process 1300 of FIG. 13 illustrates the operations in sequential order, it will be appreciated that this is merely an example, and that additional or alternative operations may be included. Further, operations of FIG. 13 and related operations may be executed in a different order than that shown, or in a parallel or overlapping fashion.

Operation 1302 includes receiving, over a network 160, network data records from a first computing device. The network data records may be instances of a network data type for a user account. The network data records may thus be for a particular user. In some implementations, the network data records may be encrypted. In some implementations, the network data records may include encrypted portions. Each record, e.g., each instance of the network data type, may have a respective timestamp. The timestamp may represent a last connection timestamp. A last connection represents a last successful connection of any of the user's devices to the network identified in the record.

Operation 1304 determines whether the received network data records include new records. New records represent networks (e.g., determined by network identifier), not already stored in the user account for the user. If the network data records include new records (1304, Yes), operation 1306 adds the new network to the user account, e.g., as an instance of network information 152. The respective timestamp for the new network is also added to the user account.

Operation 1308 determines whether any of the received network data records has conflicting information for any network already stored as part of the user account (e.g., stored instances). As discussed with regard to FIG. 12, a network discrepancy exists when the network information used to connect to a network differs between the received network data records and the network data records stored at the server. If a network does have a discrepancy (1308, Yes), operation 1310 includes determining which network data record has a later timestamp and discarding the network data record with the earlier timestamp. Thus, for example if the received network data record has a later timestamp, the server may update (replace) the stored network data record for that network with the received network data record. If the stored network data record for that network has the later timestamp, the received data record for the network may be ignored by the server. Operation 1310 is performed for any network determined to have a network discrepancy in operation 1308.

If a network does not have a network discrepancy (1308, No), operation 1312 updates the network data record stored at the server, e.g., in network data 108. If a network exists in the received network data record timestamp of the network data record operation 1312 adds a new network data record to the network data 108, including the timestamp received with the network data record. If the network already exists in the network data 108, operation 1312 may update the timestamp for the network in network data 108 if the received timestamp is later than the timestamp already stored for the network. Operation 1312 is performed for each network that does not have a network discrepancy. Once all networks have been updated based on the received network data records, operation 1314 provides the network data records to a computing device connected with the particular user, e.g., a second computing device. Operation 1314 may be repeated periodically, and independently of operations 1302 to 1312. For example, at a first interval the server may perform operation 1314 to provide updates to devices connected with the user. In some implementations, the user account 150 may include information from which the server can determine which devices are currently connected with the user. In some implementations, the server may perform operation 1314 in response to a request from a device. Process 1300 ensures that devices associated with the user account, on which the user has set network sharing, receive updated network information from other devices associated with the user account.

For example, a user may be travelling with a phone and a notebook and arrive at a conference room with a secure Wi-Fi network. The user has set the network sharing flag on both the phone and the notebook. The user can connect to the secure network with her notebook and process 1300 (combined with operations 1216 and 1222 of process 1200) so that her phone receives the secure network information and the user can use the phone to connect to the secure network without the user having to provide any network information to the phone.

Process 1300 can also be adapted to setting up a new computing device. For example, a user may have purchased a new laptop computer and as part of setting up the new laptop the user may set up the user account (e.g., account 150-1) and set the network sharing flag for the laptop. As part of a new computer setup, the laptop may connect with the user's phone via a non-network connection or peer-to-peer connection, e.g., via BLUETOOTH, WebRTC, Wi-Fi-Direct, etc. Once connected via the peer-to-peer connection the phone may perform operations 1216 to 1222 and send the network data records to the laptop via the peer-to-peer connection. The new laptop may perform process 1300 to add the networks represented in the network data records, so that the laptop can connect to any shared network. This process is different from copying network information from the phone to the laptop because only certain networks are included, e.g., disqualified networks are not shared. This provides a granularity to network sharing that increases security, minimizes peer-to-peer communications, and preserves battery life.

Figure 14:
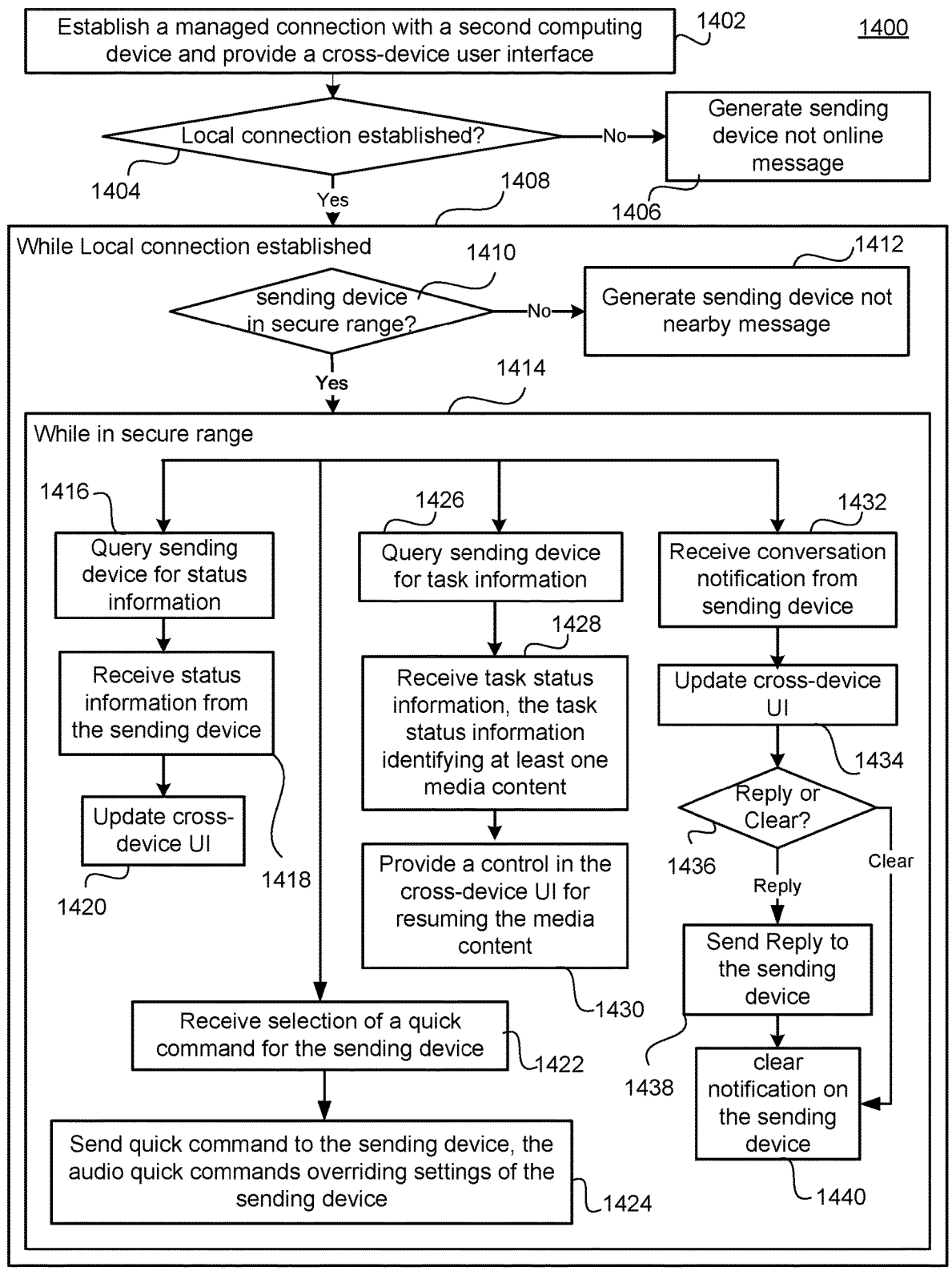
FIG. 14 is a flowchart depicting example operations of sharing device metadata by a connection manager according to an aspect.

FIG. 14 is a flowchart depicting an example process 1400 for sharing device metadata by a connection manager according to an aspect. In some implementations, process 1400 may be performed by a computing device associated with a user, such as one of the computing devices 104 of FIG. 1A. In some implementations, process 1400 may be performed by a receiving computing device, such as device 104-1 of FIG. 1A. Although the process 1400 of FIG. 14 is explained with respect to the system 100 of FIG. 1A the process 1400 may be applicable to any of the embodiments discussed herein. Although the process 1400 of FIG. 14 illustrates the operations in sequential order, it will be appreciated that this is merely an example, and that additional or alternative operations may be included. Further, operations of FIG. 14 and related operations may be executed in a different order than that shown, or in a parallel or overlapping fashion.

Operation 1402 includes establishing a managed connection with a sending computing device and providing a cross-device interface 116-1. A managed connection is a connection between the receiving computing device and a sending computing device. The managed connection may use a network connection and/or a peer-to-peer (non-network) connection. The managed connection is particular to the receiving and sending computing devices. The managed connection may be made via a combination of two local wireless connections, such as a BLUETOOTH connection and a Wi-Fi-Direct or WebRTC connection. The managed connection may be established after the user of the sending device provides an indication of approval for connecting with the receiving device.

Subsequently (e.g., after establishing the initial managed connection), operation 1404 attempts to make a local connection with the sending device. In some implementations, the sending device and receiving device may use an authentication protocol to establish the local connection. The authentication protocol may set up a communication channel over which the metadata exchanged, or portions of the exchanged metadata, can be encrypted. The authentication protocol may include channel setup, where the receiving device and the sending device exchange keys generated for the channel. For example, to establish the channel, the receiving device may send a first message to the sending device that includes a first public channel key generated for the local connection by the receiving device. This public channel key from the receiving device may be ephemeral, e.g., used at most once, for this particular local connection instance. The first public channel key may be signed by a first secret key at the receiving device. In some implementations, the first secret key may be generated via ECDH. In response to the first message, the sending device may send a second message to the receiving device. The second message may include a second public channel key generated for the local connection by the sending device. The second public channel key may be signed using a session key generated by the sending device. In some implementations, the session key may be generated via ECDH. The second message may also include the first message signed by the first secret key. The second message can also include the first message signed by a private key of the sending device. The second message may provide proof to the receiving device that the owner of the session key also owns the private key of the sending device. Responsive to receiving the second message, the receiving device may send a third message to the sending device. The third message may include the second message signed by the first secret key and the session key. The third message provides proof to the sending device that the owner of the first public channel key is the owner of the first secret key. Once the communication channel is established, messages can be sent via the local connection and may be encrypted using the session key (e.g., a key generated for and unique to this instance of the local connection).

The local connection may use any one of a number of communication protocols that operate within a relatively small range, or in other words within a small (e.g., tens or hundreds of feet/meters rather than in miles/kilometres) defined area. A local connection does not use a cellular or satellite connection. The range may be dependent on the protocol and/or the equipment used to establish the connection. For example, Wi-Fi wireless network operates in a defined location (e.g., around 150-600 feet depending on topography and equipment) and is considered a first type of local connection. Wireless peer-to-peer connections (such as BLUETOOTH, Wi-Fi Direct, and WebRTC) also operate in a defined location (e.g., within a defined range) to connect two devices and are considered a type of local connection. Implementations can use other similar protocols. The sending and receiving computers use the local connection to communicate metadata between the sending and the receiving devices, including task status information, device status information, conversation notifications, and cross-device instructions.

In some implementations, the connection manager uses dynamic switching, or in other words, switches the connection manager can change the communication protocol used for the local connection depending on a number of factors. For example, some implementations may use a hierarchical or best-available decision process. For example, the BLUETOOTH communication protocol is slower and consumes more battery than Wi-Fi and therefore may be the least-preferred protocol. Thus, if a wireless, Wi-Fi Direct, or WebRTC connection is available the local connection may use one of these other protocols. In some implementations, a wireless (e.g., Wi-Fi) communication protocol is preferred unless the wireless signal is weak, unsecured, or unavailable. A Wi-Fi Direct protocol may be used if an acceptable wireless network is unavailable. In some implementations, the Wi-Fi-Direct protocol is preferred, if available. In some implementations, a protocol may be selected because it saves battery life over another protocol, for example if the sending device or the receiving device has a low battery. In some implementations, operation 1404 (or 1408) may include re-evaluating the current local connection periodically and changing the local connection (e.g., going from Wi-Fi Direct to BLUETOOTH or from BLUETOOTH to Wi-Fi Direct) depending on connection conditions.

If a local connection is not established (1404, No), operation 1406 may display a message in the cross-device interface indicating that the sending device is not online. In some implementations, if the sending device is not online the receiving device may check for cached device status information. Cached device status information is a copy of last received device status information from the sending device. For example, the receiving device may have received device status information from the sending device at an earlier time, e.g., before the local connection was lost. The receiving device may display the cached device status information if no local connection is established. In some implementations, the cross-device interface may include an indication that the device status information is cached information. The cached information may be displayed upon launch of the receiving device. Thus, for example, the cached device status information can be used if the receiving device has not had a chance to establish the local connection, but the user has already launched the cross-device interface.

Once the receiving device and the sending device establish a local connection (1404, Yes), in some implementations, the sending device may send connection manager settings to the sending device. Thus, the sending device may receive an indication of what features to support with each new local connection. Also, once a local connection is established the two devices may exchange metadata over the local connection until the local connection is lost. If the local connection is lost, operation 1406 may be used to display the message indicating the sending device is not online until a local connection is re-established.

While the sending device and the receiving device share the local connection, operations 1408 may occur. The operations 1408 may recur until a connection is lost. The recurrence may be periodic or on-demand, depending on the operation and its implementation. Operation 1410 may determine whether the sending device is within a secure range. Operation 1410 may occur at a short interval or nearly continuously. A secure range has a range smaller than the largest possible range of the local connection. In some implementations, the secure range may be defined by the local communication protocol with the shortest range. The secure range is thus defined by a short-range wireless standard. For example, if BLUETOOTH has the shortest range of the protocols used for the dynamic local connection, the secure range may be determined by whether the two devices are capable of connecting via BLUETOOTH (even if the devices are not using BLUETOOTH for the local connection). In some implementations, the secure range may be a system setting. For example, if a distance between the two devices can be estimated using the communication protocol or another technology, the secure range may be determined based on a predefined distance. Thus, even if two devices are within the range of the short-range wireless standard of each other the secure distance may be defined as 6 feet. If the sending device is found outside of the secure range, operation 1412 will generate (display) a message on the cross-device interface indicating the sending device is not nearby and may disable functionality of the cross-device interface.

For example, a user working in a café may use the cross-device interface to get notifications from their phone without having to take the phone out of her backpack, but if the user steps away to pick up food while a friend watches the table, operation 1410 may determine that the two devices are no longer within a secure range and may trigger operation 1412 to display a message on the cross-device interface that indicates the sending device is no longer nearby. Thus, the nearby message initiated by operation 1412 can be displayed even if the sending device still maintains the local connection with the receiving device. The message indicating that the sending device is not nearby may replace device metadata normally displayed on the cross-device interface and/or may disable at least some functionality of the cross-device interface. For example, the controls for sending cross-device instructions may be disabled and/or task status controls may be removed. Thus, the sending device metadata is protected, and no cross-device instructions can be sent from the receiving device.

While the sending device is within the secure range, operations 1414 may be performed. These operations provide for the exchange and display of different types of metadata between the sending device and the receiving device, e.g., via the cross-device interface. Operation 1416 includes querying the sending device over the local connection for device status information. Operation 1416 is optional, as the sending device may push device status information independently of a query (e.g., no query is sent). For example, the sending device may push device status information. The device status information includes system information, which can include one or more of current sound mode, battery power, wireless network strength, cellular signal strength, an alphabetic (user-friendly) device identifier, whether an alarm or timer is currently set, minutes left on a timer, etc. Operation 1418 includes receiving the requested device status information from the sending device over the local connection. Operation 1420 includes updating the cross-device user interface with the newly received device status information. One of operation 1418 and 1420 can also include caching the device status information locally at the receiving device. This cached device status information can be used, if needed, in operation 1406. Operations 1416 to 1420 may be performed at repeated intervals. The interval may be independent of other metadata exchanges between the receiving and the sending devices. The interval may be dependent on power consumption or local connection attributes. For example, operation 1416 may occur less frequently when either of the sending device or the receiving device has low battery (e.g., less than 10%) to preserve battery life. As another example, operation 1416 may occur less frequently when the local connection is unstable. In some implementations, operation 1416 may occur every 10 seconds, every 30 seconds, every minute, every two minutes, every 5 minutes, etc. Operations 1418 and 1420 occur responsive to a response provided to operation 1416.

Operation 1422 includes receiving a selection of a quick command for the sending device. The cross-device user interface may include one or more controls, each corresponding to a respective quick command. User selection/activation of a control for the quick command initiates operation 1422 for the corresponding quick command. Thus, operation 1422 repeats on-demand, or in other words in response to user action. Example quick commands include modifying/overriding the sound mode of the sending device, turning a timer off on the sending device, turning an alarm off on the sending device, causing the sending device to output a sound regardless of the current sound mode, turning on a hot spot or sharing mode (tethering), turning on airplane mode, etc. Operation 1424 sends the quick command to the sending device. As indicated earlier, the audio quick commands override the current sound mode of the sending device. Thus, for example, the quick commands can be used to silence the sending device to silence a ringtone or to cause the sending device to play a ringtone. This override may be a temporary change or may not be temporary. In some implementations, the user may choose, e.g., in the settings interface, whether the override is temporary or not.

Operation 1426 may include querying the sending device for task status information. Operation 1426 is optional, as in some implementations the sending device may push the task status information independently of a query (e.g., no query from the receiving device is needed). Operation 1428 includes receiving the task status information from the sending device. Task status information includes content (e.g., a web site, media file, image file, video file, etc.) recently accessed on the sending device capable of being resumed on the receiving device. In some implementations, content of specified types is provided. In some implementations, the user of the sending device can determine which types of content are provided in the task status information. In some implementations, a last-accessed time associated with the content is used to filter the content provided in the task status information. For example, in some implementations, the last two websites accessed by the device are provided in the task status information. In some implementations, the last two websites are only provided if the last-access time is within a predetermined time period, such as two days, 24 hours, 12 hours, etc. Example tasks that may be included in the task status information are resuming a video, resuming a song, or resuming browsing a website. The task status information may include other tasks that do not resume content, but may provide a preview of content, for example, providing a thumbnail of a recent photo, photos, or videos taken on the sending device (e.g., taken or accessed within a predetermined time period).

Operation 1430 may include providing a control (actionable link, button, icon, etc.) for each received task in the task status information, the control activating the content. Activation may depend on the type of task. For example, activating a website may include opening a browser on the receiving device and loading the website. For content that is an image file, the control may be a thumbnail of the image. Activating the control for the image may result in a request being sent to the sending device for the full size image and providing the user an opportunity to share, copy, or save the image provided in response to the image. Operation 1426 may be performed in response to establishing a local connection with the receiving device. Thus, operation 1426 may be performed each time the sending device and receiving device establish the local connection.

Operation 1432 may include receiving a conversation notification from the sending device. The conversation notification may include attributes, such as which application the notification was received in or an indication of the type of the notification, who the notification was received from, how long ago the notification was received, etc. Operation 1432 may be performed each time the sending device pushes a conversation notification to the receiving device. Operation 1432 differs from mirroring a device screen because only certain notifications are sent, so not every notification that is provided to the user on the sending device will be pushed as a conversation notification. In some implementations, the user of the sending device can select which communication apps and/or which senders will be pushed to the receiving device. Thus, operation 1432 may enable the user to control the number, type, and senders, reducing the number of notifications pushed. Reducing this number enables the user to receive important communications while reducing network bandwidth usage and device power usage. Operation 1434 updates the cross-device user interface with the received conversation notification. The update may provide the user with a control (button, link, icon) or controls that, when activated/selected by the user, enables the user to reply to the communication or to clear the notification. Operation 1436 determines whether the user selects (actuates) a reply control or a cancel control. If a user chooses to reply (e.g., by selecting or activating the reply control), operation 1438 includes sending the reply to the sending device over the local connection. This may also clear the notification on the sending device, e.g., via operation 1440. The user can also initiate operation 1434 by selection of the clear control. FIGS. 3 and 4 provide examples of conversation notifications and the reply control and clear control.

Figure 15:
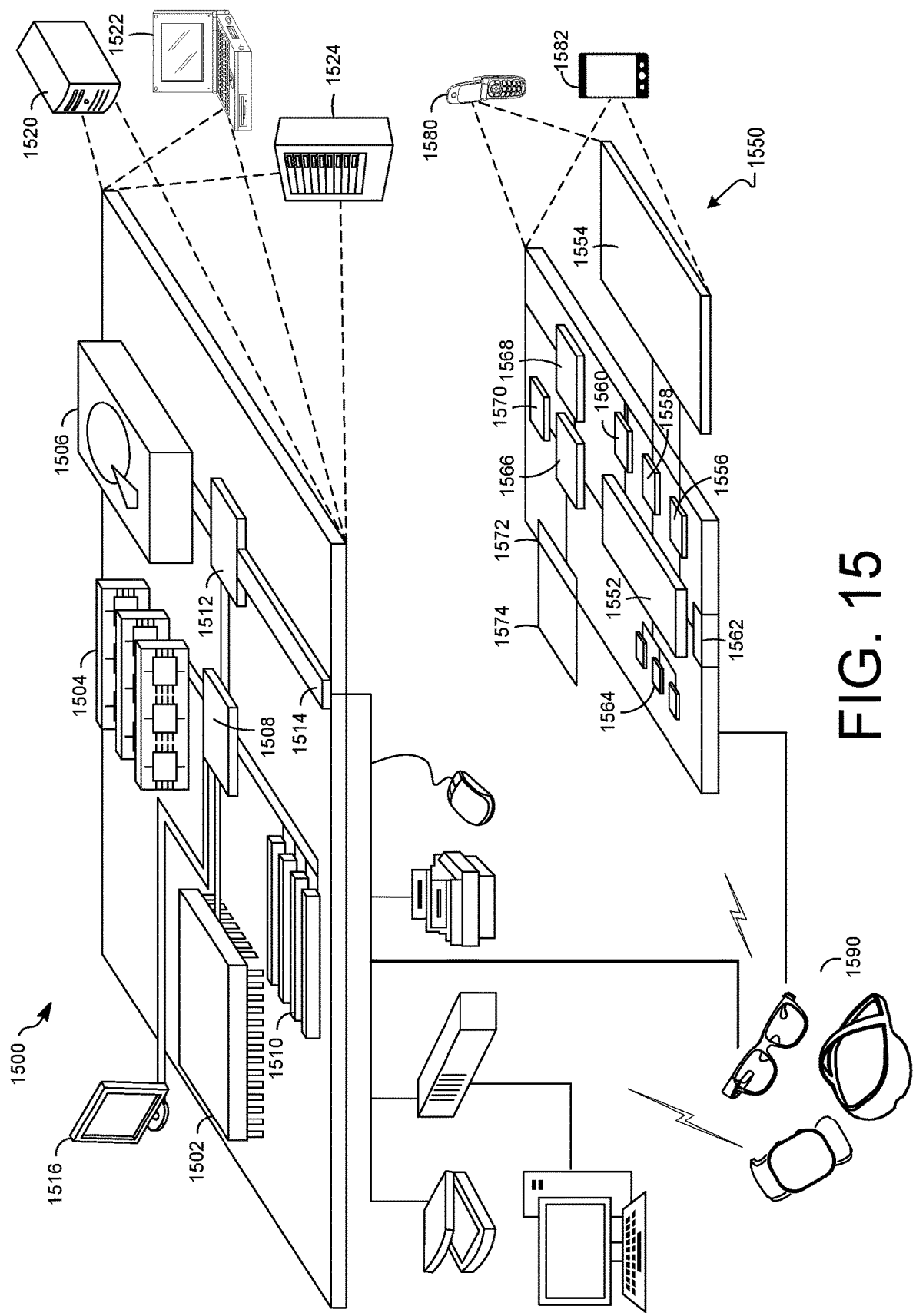
FIG. 15 shows an example of example computing devices according to an aspect.

FIG. 15 shows an example of a computer device 1500 and a mobile computer device 1550, which may be used with the techniques described here. In some implementations, the computer device 1500 is an example of the computing device 104-1 or the computing device 104-2. In some implementations, the computer device 1500 is an example of the server computer 102. In some implementations, the mobile computer device 1550 is an example of the computing device 104-1 or the computing device 104-2. Computing device 1500 is intended to represent various forms of digital computers, such as laptops, desktops, tablets, workstations, personal digital assistants, televisions, servers, blade servers, mainframes, and other appropriate computing devices. Computing device 1550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1500 includes a processor 1502, memory 1504, a storage device 1506, a high-speed interface 1508 connecting to memory 1504 and high-speed expansion ports 1510, and a low speed interface 1512 connecting to low speed bus 1514 and storage device 1506. The processor 1502 can be a semiconductor-based processor. The memory 1504 can be a semiconductor-based memory. Each of the components 1502, 1504, 1506, 1508, 1510, and 1512, are interconnected using various busses, and may be mounted on a common motherboard or in other manners as appropriate. The processor 1502 can process instructions for execution within the computing device 1500, including instructions stored in the memory 1504 or on the storage device 1506 to display graphical information for a GUI on an external input/output device, such as display 1516 coupled to high speed interface 1508. In other implementations, multiple processors and/or multiple buses may be used, as appropriate, along with multiple memories and types of memory. Also, multiple computing devices 1500 may be connected, with each device providing portions of the necessary operations (e.g., as a server bank, a group of blade servers, or a multi-processor system).

The memory 1504 stores information within the computing device 1500. In one implementation, the memory 1504 is a volatile memory unit or units. In another implementation, the memory 1504 is a non-volatile memory unit or units. The memory 1504 may also be another form of computer-readable medium, such as a magnetic or optical disk.

The storage device 1506 is capable of providing mass storage for the computing device 1500. In one implementation, the storage device 1506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1504, the storage device 1506, or memory on processor 1502.

The high speed controller 1508 manages bandwidth-intensive operations for the computing device 1500, while the low speed controller 1512 manages lower bandwidth-intensive operations. Such allocation of functions is exemplary only. In one implementation, the high-speed controller 1508 is coupled to memory 1504, display 1516 (e.g., through a graphics processor or accelerator), and to high-speed expansion ports 1510, which may accept various expansion cards (not shown). In the implementation, low-speed controller 1512 is coupled to storage device 1506 and low-speed expansion port 1514. The low-speed expansion port, which may include various communication ports (e.g., USB, BLUETOOTH, Ethernet, wireless Ethernet) may be coupled to one or more input/output devices, such as a keyboard, a pointing device, a scanner, or a networking device such as a switch or router, e.g., through a network adapter.

The computing device 1500 may be implemented in a number of different forms, as shown in the figure. For example, it may be implemented as a standard server 1520, or multiple times in a group of such servers. It may also be implemented as part of a rack server system 1524. In addition, it may be implemented in a personal computer such as a laptop computer 1522. Alternatively, components from computing device 1500 may be combined with other components in a mobile device (not shown), such as device 1550. Each of such devices may contain one or more of computing devices 1500, 1550, and an entire system may be made up of multiple computing devices 1500, 1550 communicating with each other.

Computing device 1550 includes a processor 1552, memory 1564, an input/output device such as a display 1554, a communication interface 1566, and a transceiver 1568, among other components. The device 1550 may also be provided with a storage device, such as a microdrive or other device, to provide additional storage. Each of the components 1550, 1552, 1564, 1554, 1566, and 1568, are interconnected using various buses, and several of the components may be mounted on a common motherboard or in other manners as appropriate.

The processor 1552 can execute instructions within the computing device 1550, including instructions stored in the memory 1564. The processor may be implemented as a chipset of chips that include separate and multiple analog and digital processors. The processor may provide, for example, for coordination of the other components of the device 1550, such as control of user interfaces, applications run by device 1550, and wireless communication by device 1550.

Processor 1552 may communicate with a user through control interface 1558 and display interface 1556 coupled to a display 1554. The display 1554 may be, for example, a TFT LCD (Thin-Film-Transistor Liquid Crystal Display) or an OLED (Organic Light Emitting Diode) display, or other appropriate display technology. The display interface 1556 may comprise appropriate circuitry for driving the display 1554 to present graphical and other information to a user. The control interface 1558 may receive commands from a user and convert them for submission to the processor 1552. In addition, an external interface 1562 may be provided in communication with processor 1552, so as to enable near area communication of device 1550 with other devices. External interface 1562 may provide, for example, for wired communication in some implementations, or for wireless communication in other implementations, and multiple interfaces may also be used.

The memory 1564 stores information within the computing device 1550. The memory 1564 can be implemented as one or more of a computer-readable medium or media, a volatile memory unit or units, or a non-volatile memory unit or units. Expansion memory 1574 may also be provided and connected to device 1550 through expansion interface 1572, which may include, for example, a SIMM (Single In Line Memory Module) card interface. Such expansion memory 1574 may provide extra storage space for device 1550, or may also store applications or other information for device 1550. Specifically, expansion memory 1574 may include instructions to carry out or supplement the processes described above, and may include secure information also. Thus, for example, expansion memory 1574 may be provided as a security module for device 1550, and may be programmed with instructions that permit secure use of device 1550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1564, expansion memory 1574, or memory on processor 1552 that may be received, for example, over transceiver 1568 or external interface 1562.

Device 1550 may communicate wirelessly through communication interface 1566, which may include digital signal processing circuitry where necessary. Communication interface 1566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1568. In addition, short-range communication may occur, such as using a BLUETOOTH, Wi-Fi, or other such transceiver (not shown). In addition, GPS (Global Positioning System) receiver module 1570 may provide additional navigation- and location-related wireless data to device 1550, which may be used as appropriate by applications running on device 1550.

Device 1550 may also communicate audibly using audio codec 1560, which may receive spoken information from a user and convert it to usable digital information. Audio codec 1560 may likewise generate audible sound for a user, such as through a speaker, e.g., in a handset of device 1550. Such sound may include sound from voice telephone calls, may include recorded sound (e.g., voice messages, music files, etc.) and may also include sound generated by applications operating on device 1550.

The computing device 1550 may be implemented in a number of different forms, as shown in the figure. For example, it may be implemented as a cellular telephone 1580. It may also be implemented as part of a smart phone 1582, personal digital assistant, tablet, wearable 1590, or another similar mobile device.

In some implementations, the computing devices depicted in the figure can include sensors that interface with a wearable (e.g., AR headset/HMD) device 1590 to generate an augmented environment for viewing inserted content within the physical space. For example, one or more sensors included on a computing device 1550 or other computing device depicted in the figure, can provide input to the AR headset 1590 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 1550 can use the sensors to determine an absolute position and/or a detected rotation of the computing device in the AR space that can then be used as input to the AR space. For example, the computing device 1550 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connect to, the computing device 1550 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1550 when the computing device is incorporated into the AR space can cause a particular action to occur in the AR space.

In some implementations, a touchscreen of the computing device 1550 can be rendered as a touchpad in AR space. A user can interact with the touchscreen of the computing device 1550. The interactions are rendered, in AR headset 1590 for example, as movements on the rendered touchpad in the AR space. The rendered movements can control virtual objects in the AR space.

In some implementations, one or more output devices included on the computing device 1550 can provide output and/or feedback to a user of the AR headset 1590 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example computer-implemented methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

In one aspect, a computer-implemented method may be performed on a receiving computing device. The computer-implemented method may include establishing a local connection with a sending computing device, receiving device status information and task status information from the sending computing device using the local connection, the task status information identifying at least one media content, and generating a user interface that includes a graphical representation of the device status information and a first control that, when selected, executes the at least one media content in an application on the receiving computing device.

Implementations may include any of the following features alone or in combination. For example, the method may also include at an interval, determining whether the sending computing device is within a distance defined by a secure range and in response to determining that the sending computing device is not within the distance, disabling at least some functionality of the user interface. As another example, the user interface includes a second control for initiating, on the sending computing device, a sharing mode between the receiving computing device and the sending computing device established using a unique service identifier and password for the receiving computing device, the sharing mode enabling the receiving computing device to use cellular network data connection of the sending computing device. As another example, the user interface can include a second control for overriding a sound mode on the sending computing device. In some such implementations, overriding the sound mode can include activating a do-not-disturb mode, causing the sending device to emit sound regardless of the current sound mode on the sending computing device, and/or causing the sending device to enter a mute mode. The do-not-disturb mode has a duration of a predetermined time.

As another example, the local connection may be established at a first time and the method may also include caching the device status information, determining, at a second time later than the first time, that no connection with the sending computing device is established, and generating the user interface with the cached device status information. As another example, the at least one media content may be audio content accessed within a predetermined time on the sending computing device, the task status information includes a playback start time, and the computer-implemented method may also include, in response to selection of the first control, initiating playback of the audio content at the playback start time. As another example, the at least one media content may be video content accessed within a predetermined time on the sending computing device, the task status information may include a playback start time, and the computer-implemented method may also include, in response to selection of the first control, initiating playback of the video content at the playback start time. As another example, the first control may not be selectable unless the receiving computing device has a network connection. As another example, the method may also include receiving, from the sending computing device, updated device status information and modifying the graphical representation of the device status information with the updated device status information. As another example, the method may also include executing the at least one media content in the application in response to selection of the first control. As another example, the execution of the at least one media content may be performed without a further user input being provided at the sending computing device following the selection of the first control.

In one aspect, a computer-implemented method may include generating a user interface element that controls a network sharing status for a user account of the computing device, the network sharing status being one of an off state and an on state. Responsive to detecting an interaction with the user interface element that sets the network sharing status to the on state the method may also include identifying a locally stored network as shareable, generating an instance of a network data type for the locally stored network, the network data type including a timestamp for the locally stored network representing a connection time for the locally stored network, associating the instance with the user account, and modifying the network sharing status associated with the user account to the on state, wherein associating the instance of with the user account provides the instance to another device associated with the user account.

Implementations may include any of the following features alone or in combination. For example, the locally stored network may be a first network and determining that the locally stored network is shareable can include receiving network details of networks stored in memory of the computing device, the networks stored in the memory including the first network, identifying the first network as secured, and identifying the first network as not inherited from another user account. In some such implementations, determining the locally stored network is shareable can include identifying the first network as not a hidden network. A network may be inherited when the network is shared from another user account on the computing device or was added to the computing device by an enterprise policy. As another example, the instance may be a first instance and the method may also include sending the first instance and the network sharing status to a server, wherein the server compares the first instance with stored instances of the network data type for the user account and updates a second instance of the stored instances with the first instance responsive to determining that a network identifier of the first instance matches a network identifier of the second instance and the timestamp of the first instance is later than a timestamp for the second instance. As another example, the network sharing status may be associated with the user account is stored on the computing device and not synchronized with user account information for the user account on a server.

In one aspect, a non-transitory computer-readable medium stores instructions that, when executed by a processor on a receiving computing device, causes the receiving computing device to perform any of the methods disclosed herein.

In one aspect, a computing device can be configured with at least one processor and memory storing instructions that, when executed by the at least one processor, performs any of the methods disclosed herein.

What is claimed is:

1. A computing device comprising:
at least a processor;
a display; and
memory storing instructions that, when executed by the processor, cause the computing device to perform operations including:
generating a user interface element that controls a network sharing status for a user account of the computing device, the network sharing status being one of an off state and an on state; and
responsive to detecting an interaction with the user interface element that sets the network sharing status to the on state:
identifying a locally stored network as shareable,
generating an instance of a network data type for the locally stored network, the network data type including a timestamp for the locally stored network representing a connection time for the locally stored network,
associating the instance with the user account, and
modifying the network sharing status associated with the user account to the on state, wherein associating the instance of with the user account provides the instance to another device associated with the user account.

2. The computing device of claim 1, wherein the locally stored network is a first network and determining that the locally stored network is shareable includes:
receiving network details of networks stored in memory of the computing device, the networks stored in the memory including the first network;
identifying the first network as secured; and
identifying the first network as not inherited from another user account.

3. The computing device of claim 2, wherein determining the locally stored network is shareable further includes:
identifying the first network as not a hidden network.

4. The computing device of claim 2, wherein a network is inherited when the network is shared from another user account on the computing device or was added to the computing device by an enterprise policy.

5. The computing device of claim 1, wherein the instance is a first instance and the instructions further causing the computing device to perform operations including:
sending the first instance and the network sharing status to a server,
wherein the server compares the first instance with stored instances of the network data type for the user account and updates a second instance of the stored instances with the first instance responsive to determining that a network identifier of the first instance matches a network identifier of the second instance and the timestamp of the first instance is later than a timestamp for the second instance.

6. The computing device of claim 1, wherein the network sharing status associated with the user account is stored on the computing device and not synchronized with user account information for the user account on a server.

7. A method comprising:
generating a user interface element that controls a network sharing status for a user account of a computing device, the network sharing status being one of an off state and an on state; and
responsive to detecting an interaction with the user interface element that sets the network sharing status to the on state: identifying a locally stored network as shareable,
generating an instance of a network data type for the locally stored network, the network data type including a timestamp for the locally stored network representing a connection time for the locally stored network,
associating the instance with the user account, and
modifying the network sharing status associated with the user account to the on state, wherein associating the instance of with the user account provides the instance to another device associated with the user account.

8. The method of claim 7, wherein the locally stored network is a first network and determining that the locally stored network is shareable includes:
receiving network details of networks stored in memory of the computing device, the networks stored in the memory including the first network;
identifying the first network as secured; and
determining that the first network as not inherited from another user account.

9. The method of claim 8, wherein determining the locally stored network is shareable further includes:
identifying the first network as not a hidden network.

10. The method of claim 8, wherein a network is determined to be inherited when the network is shared from another user account on the computing device or was added to the computing device by an enterprise policy.

11. The method of claim 7, wherein the instance is a first instance and the method further comprises:
sending the first instance and the network sharing status to a server,
wherein the server compares the first instance with stored instances of the network data type for the user account and updates a second instance of the stored instances with the first instance responsive to determining that a network identifier of the first instance matches a network identifier of the second instance and the timestamp of the first instance is later than a timestamp for the second instance.

12. The method of claim 7, wherein the network sharing status associated with the user account is stored on the computing device and not synchronized with user account information for the user account on a server.

13. A non-transitory computer-readable medium storing instructions that, when executed by at least one processor, cause a computing device to perform operations comprising:
generating a user interface element that controls a network sharing status for a user account of the computing device, the network sharing status being one of an off state and an on state; and
responsive to detecting an interaction with the user interface element that sets the network sharing status to the on state:
identifying a locally stored network as shareable,
generating an instance of a network data type for the locally stored network, the network data type including a timestamp for the locally stored network representing a connection time for the locally stored network,
associating the instance with the user account, and
modifying the network sharing status associated with the user account to the on state, wherein associating the instance of with the user account provides the instance to another device associated with the user account.

14. The non-transitory computer-readable medium of claim 13, wherein the locally stored network is a first network and determining that the locally stored network is shareable includes:
receiving network details of networks stored in memory of the computing device, the networks stored in the memory including the first network;
identifying the first network as secured; and
determining that the first network as not inherited from another user account.

15. The non-transitory computer-readable medium of claim 14, wherein determining the locally stored network is shareable further includes:
identifying the first network as not a hidden network.

16. The non-transitory computer-readable medium of claim 14, wherein a network is inherited in response to determining that the network is shared from another user account on the computing device or was added to the computing device by an enterprise policy.

17. The non-transitory computer-readable medium of claim 13, wherein the instance is a first instance and the operations further comprise:
sending the first instance and the network sharing status to a server,
wherein the server compares the first instance with stored instances of the network data type for the user account and updates a second instance of the stored instances with the first instance responsive to determining that a network identifier of the first instance matches a network identifier of the second instance and the timestamp of the first instance is later than a timestamp for the second instance.

18. The non-transitory computer-readable medium of claim 13, wherein the network sharing status associated with the user account is stored on the computing device and not synchronized with user account information for the user account on a server.

* * * * *